(12) United States Patent
Spies et al.

(10) Patent No.: US 9,754,318 B1
(45) Date of Patent: Sep. 5, 2017

(54) RELATIVE SPENDING PATTERN REPORTS FOR A FINANCIAL MANAGEMENT SYSTEM

(75) Inventors: J W M Spies, Mountain View, CA (US); John Reed Flora, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 2131 days.

(21) Appl. No.: 11/552,837

(22) Filed: Oct. 25, 2006

(51) Int. Cl.
  *G06Q 20/10* (2012.01)
  *G06Q 40/00* (2012.01)

(52) U.S. Cl.
  CPC ............ *G06Q 40/00* (2013.01); *G06Q 20/10* (2013.01)

(58) Field of Classification Search
  None
  See application file for complete search history.

(56) References Cited

U.S. PATENT DOCUMENTS

| | | | |
|---|---|---|---|
| 5,358,278 A * | 10/1994 | Ellis | 281/31 |
| 5,433,483 A * | 7/1995 | Yu | 283/58 |
| 6,442,515 B1 * | 8/2002 | Varma et al. | 703/22 |
| 6,611,807 B1 * | 8/2003 | Bernheim et al. | 705/36 R |
| 6,968,316 B1 * | 11/2005 | Hamilton | 705/36 R |
| 7,086,586 B1 * | 8/2006 | Sullivan | 235/379 |
| 7,606,750 B1 * | 10/2009 | Hoag et al. | 705/35 |
| 2001/0029475 A1 * | 10/2001 | Boicourt et al. | 705/30 |
| 2002/0123949 A1 * | 9/2002 | VanLeeuwen | 705/35 |
| 2005/0289025 A1 * | 12/2005 | Fredericks et al. | 705/30 |
| 2006/0085309 A1 * | 4/2006 | Tamura | 705/35 |
| 2006/0218087 A1 * | 9/2006 | Zimmerman | 705/39 |

* cited by examiner

*Primary Examiner* — Anita Coupe
*Assistant Examiner* — Nancy Prasad
(74) *Attorney, Agent, or Firm* — Hawley Troxell Ennis & Hawley LLP; Philip McKay

(57) ABSTRACT

A method and apparatus for displaying relative spending pattern data includes a process for displaying relative spending pattern data and/or an application for displaying relative spending pattern reports whereby, data representing various financial transactions is obtained and categorized by a computing system implemented financial management system. The financial transaction data is then stored. A user is then provided with a user interface including a capability to activate a selected item in order to generate a relative spending pattern data report for the selected item. Once an item is selected and/or activated, relative spending pattern report parameters are automatically selected based on historical transaction data and/or input by customers/users. A relative spending pattern report is then prepared using data from the computing system implemented financial management system and the relative spending pattern report parameters provided.

33 Claims, 9 Drawing Sheets

300A

| SEPT | 304 | | | | |
|---|---|---|---|---|---|
| DATE | PAYEE | AMOUNT | CATEGORY | PMT SOURCE | |
| 09/1 | STARBUCKS | $3.30 | DINING OUT | ATM CARD | 301 |
| 09/1 | CHEVRON | $56.75 | GAS | CREDIT CARD | 303 |
| 09/4 | SAFEWAY STORES | $106.21 | GROCERIES | ATM CARD | 305 |
| 09/5 | PG&E | $96.30 | UTILITIES | CHECKING BP | 307 |
| 09/6 | CELL PHONE | $86.01 | PHONE | CHECKING BP | 309 |
| 09/8 | STARBUCKS | $5.92 | DINING OUT | ATM CARD | 311 |
| 09/15 | JOES AUTO | $406.21 | AUTO REPAIR | CREDIT CARD | 313 |
| 09/15 | IRS | $1425.00 | TAXES | CHECK 131 | 315 |
| 09/15 | ACME PLUMBING | $189.13 | HOME REPAIR | CHECK 132 | 317 |

| | | | 300B | | |
|---|---|---|---|---|---|
| SEPT | 304 | | | | |
| DATE | PAYEE 306B | AMOUNT | CATEGORY | PMT SOURCE | |
| 09/1 | ///////// | $3.30 | DINING OUT | ATM CARD | 301 |
| 09/1 | CHEVRON | | | CREDIT CARD | 303 |
| 09/4 | SAFEWAY STO | | | ATM CARD | 305 |
| 09/5 | PG&E | | | CHECKING BP | 307 |
| 09/6 | CELL PHON | | | CHECKING BP | 309 |
| 09/8 | STARBUCK | | | ATM CARD | 311 |
| 09/15 | JOES AUT | | | CREDIT CARD | 313 |
| 09/15 | IRS | | | CHECK 131 | 315 |
| 09/15 | ACME PLUMB | | | CHECK 132 | 317 |

302

STARBUCKS SPENDING 321B

REPORT TIMEFRAME — 323B [MONTH] 325B

AVERAGE/TARGET BASED ON — [QTR] 327B

50%

///////// | 329B

AVERAGE/TARGET — $35.66
AMOUNT SPENT TO DATE — $9.22
PERCENT OF AVERAGE/TARGET — 26
DATE — 9/15
PERCENT OF PERIOD PASSED — 50

TRANSACTIONS TO DATE IN PERIOD

| | | | | | |
|---|---|---|---|---|---|
| SEPT | 304 | | | | |
| DATE | PAYEE | AMOUNT | CATEGORY | PMT SOURCE | |
| 09/1 | STARBUCKS | $3.30 | DINING OUT | ATM CARD | 301 |
| 09/1 | CHEVRON | $56.75 | GAS | CREDIT CARD | 303 |
| 09/4 | SAFEWAY STORES | $106.21 | GROCERIES | ATM CARD | 305 |
| 09/5 | ///////////// | $96.30 | UTILITIES | CHECKING BP | 307 |
| 09/6 | CELL PHO | | | CHECKING BP | 309 |
| 09/8 | STARBUCK | | | ATM CARD | 311 |
| 09/15 | JOES AUT | | | CREDIT CARD | 313 |
| 09/15 | IRS | | | CHECK 131 | 315 |
| 09/15 | ACME PLUM | | | CHECK 132 | 317 |

300D

302

PG&E SPENDING 321D

REPORT TIMEFRAME- [MONTH] 323D

AVERAGE/TARGET BASED ON- [6 MO] 325D

327D
AVG
MAR APR MAY JUN JUL AUG SEPT

AVERAGE/TARGET – $256.52  329D
AMOUNT SPENT TO DATE – $96.30
PERCENT OF AVERAGE/TARGET – 37
DATE – 9/15
PERCENT OF PERIOD PASSED – N/A

TRANSACTIONS TO DATE IN PERIOD
03/5   $378.00
04/5   $347.09
05/5   $281.00
06/5   $250.45
07/5   $181.22
08/5   $101.33          331D
09/5   $96.30

| SEPT | 304 | | | |
|---|---|---|---|---|
| DATE | PAYEE | AMOUNT | CATEGORY | PMT SOURCE |
| 09/1 | STARBUCKS | $3.30 | DINING OUT | ATM CARD 306E | 301
| 09/1 | CHEVRON | $56.75 | GAS | ///////// | 303
| 09/4 | SAFEWAY ST | | | ATM CARD | 305
| 09/5 | PG&E | | | CHECKING BP | 307
| 09/6 | CELL PHO | | | CHECKING BP | 309
| 09/8 | STARBUCK | | | ATM CARD | 311
| 09/15 | JOES AUT | | | CREDIT CARD | 313
| 09/15 | IRS | | | CHECK 131 | 315
| 09/15 | ACME PLUM | | | CHECK 132 | 317

302

CREDIT CARD SPENDING 321E

REPORT TIMEFRAME — [MONTH] 323E

AVERAGE/TARGET BASED ON — [YR] 325E

327E

AVG [bar chart]
S O N D J F M A M J J A S

AVERAGE/TARGET — $339.02  329E
AMOUNT SPENT TO DATE — $462.96
PERCENT OF AVERAGE/TARGET — 118
DATE — 9/15
PERCENT OF PERIOD PASSED — 50

TRANSACTIONS TO DATE IN PERIOD
09/1   CHEVRON     $56.75
09/15  JOE'S AUTO  $406.21
                           331E

RELATIVE SPENDING PATTERN REPORTS FOR A FINANCIAL MANAGEMENT SYSTEM

BACKGROUND

Currently, several computing system implemented financial management systems are available including, but is not limited to: computing system implemented personal financial management systems; computing system implemented small business financial management systems; computing system implemented general business financial management systems; computing system implemented tax preparation systems; computing system implemented accounting and/or invoicing systems; and various other electronic transaction driven data management systems, packages, programs, modules, or applications.

Many computing system implemented financial management systems help users manage their finances, by providing a centralized interface with banks, credit card companies, and other various financial institutions, for identifying and categorizing user financial transactions. Currently, computing system implemented financial management systems typically obtain financial transaction information, such as payee, payment amount, date, etc. via communication with banks, credit card providers, or other financial institutions, using electronic data transfer systems such as the Open Financial Exchange (OFX) specification, Web Direct, or various other systems for transferring financial transaction data.

As noted above, using computing system implemented financial management systems, the financial transaction information, such as payee, payment amount, date, etc. is used by the computing system implemented financial management system to categorize individual financial transactions as a particular type of income or expense. Some currently offered computing system implemented financial management systems then use this financial transaction information to track events, such as purchase events, and to provide various relative spending pattern reports or displays including "to date" data reports such as historical spending data reports in particular categories or for particular payees. Currently, these relative spending pattern reports are largely text based and "fixed" in the sense that in order to obtain a relative spending pattern report the user must define a specific timeframe for each relative spending pattern report. Then, in order to view a different timeframe of activity, a new relative spending pattern report must be requested with new specific time parameters.

Experience has shown that a user is more likely to adopt, and continue to use, a given computing system implemented financial management system and/or feature if the computing system implemented financial management system or feature is intuitive, includes a flexible presentation format, and presents the data and/or reports in a visual presentation, as opposed to a largely text based report. In addition, experience has also shown that the easier the user interface, and in particular, the less actual typing required to obtain useful data, the more likely it is that a user will implement and use the report feature and the given computing system implemented financial management system.

SUMMARY

In accordance with one embodiment, a method and apparatus for displaying relative spending pattern data includes a process for displaying relative spending pattern data and/or an application for displaying relative spending pattern reports whereby, in one embodiment, data representing various financial transactions is obtained and categorized by a computing system implemented financial management system. The financial transaction data is then stored.

In one embodiment, a user is then provided with a user interface including a capability to activate a selected item in order to generate a relative spending pattern data report for the selected item. In one embodiment, once an item is selected and/or activated, relative spending pattern report parameters are automatically selected based on historical transaction data collected by the computing system implemented financial management system and/or input provided to the provider of the computing system implemented financial management system, and/or the process for displaying relative spending pattern data, by customers/users. In one embodiment, the relative spending pattern report parameters automatically selected are defaults which can be overwritten by the user. In one embodiment, the relative spending pattern report parameters include: the timeframe of the relative spending pattern report; the period used to determine an average and or target spending amount for the relative spending report timeframe; and what type of visual display of the data is to be used.

In one embodiment, a relative spending pattern report is then prepared using data from the computing system implemented financial management system and the relative spending pattern report parameters provided. In one embodiment, the relative spending pattern report is then displayed to the user and, in one embodiment, includes a visual display of current spending versus the average and or target spending amount for the selected period based on the relative spending pattern report parameters provided.

In one embodiment, the relative spending pattern report is displayed by activating a financial transaction item selected from a transaction register and the relative spending pattern report is displayed within the context of the selected item.

The method and apparatus for displaying relative spending pattern data disclosed herein provides the user with an intuitive and flexible presentation format that displays the relative spending data and/or reports in an easily digested visual presentation within the context of the selected item, and in relation to previous spending averages and/or targets calculated. In addition, the method and apparatus for displaying relative spending pattern data disclosed herein requires less reading, typing and/or user interfacing to obtain and customize data. Consequently, using the method and apparatus for displaying relative spending pattern data disclosed herein it is more likely that a user will implement and use the relative spending pattern report feature.

In addition, as discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

FIG. 3A shows a transaction register of a user interface and/or display as it would be displayed on the screen of a display device in accordance with the principles of one embodiment;

FIG. 3B shows a transaction register of a user interface and/or display and a relative spending pattern report as it would be displayed on the screen of a display device in accordance with the principles of one embodiment;

FIG. 3D shows a transaction register of a user interface and/or display and a relative spending pattern report as it would be displayed on the screen of a display device in accordance with the principles of one embodiment;

FIG. 3E shows a transaction register of a user interface and/or display and a relative spending pattern report as it would be displayed on the screen of a display device in accordance with the principles of one embodiment;

Figure 1:
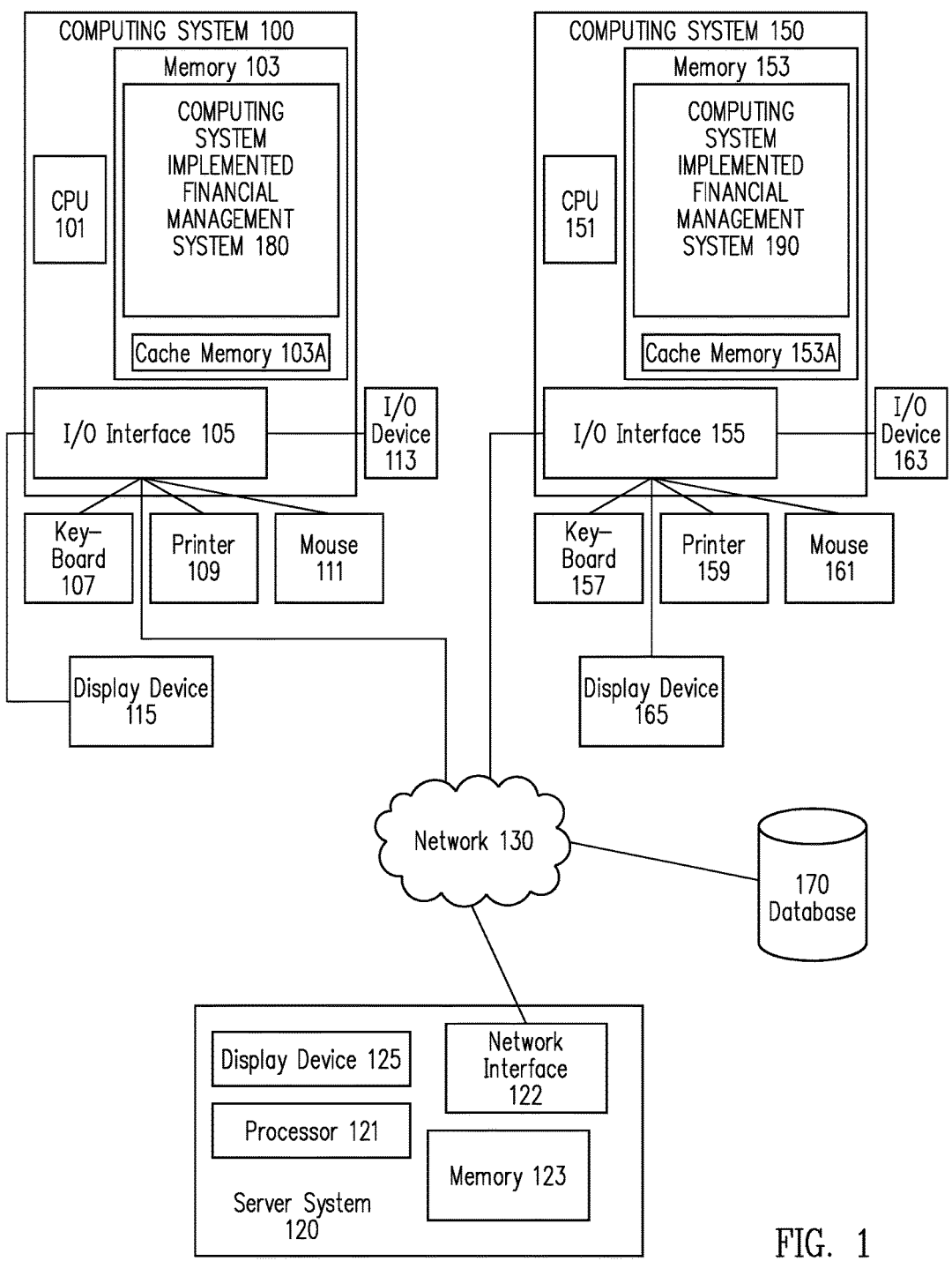
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In addition, the particular screen layouts, appearance, and terminology as depicted and described herein, are intended to be illustrative and exemplary only, and in no way limit the scope of the invention as claimed.

In accordance with one embodiment, a method and apparatus for displaying relative spending pattern data includes a process for displaying relative spending pattern data (200 In FIG. 2) and/or an application for displaying relative spending pattern reports (401 In FIG. 4) whereby, in one embodiment, data representing various financial transactions is obtained and categorized by a computing system implemented financial management system. The financial transaction data is then stored.

In one embodiment, a user is then provided with a user interface and/or display (300A in FIG. 3A, 300B in FIG. 3B, 300C in FIG. 3C, 300D in FIG. 3D, 300E in FIG. 3E) including a capability to activate a selected item in order to generate a relative spending pattern data report for the selected item. In one embodiment, once an item is selected and/or activated, relative spending pattern report parameters are automatically selected based on historical transaction data collected by the computing system implemented financial management system and/or input provided to the provider of the computing system implemented financial management system, and/or the process for displaying relative spending pattern data, by customers/users. In one embodiment, the relative spending pattern report parameters automatically selected are defaults which can be overwritten by the user. In one embodiment, the relative spending pattern report parameters include: the timeframe of the relative spending pattern report; the period used to determine an average and or target spending amount for the relative spending report timeframe; and what type of visual display of the data is to be used.

In one embodiment, a relative spending pattern report (319B in FIG. 3B, 319C in FIG. 3C, 319D in FIG. 3D, 319E in FIG. 3E) is then prepared using data from the computing system implemented financial management system and the relative spending pattern report parameters provided. In one embodiment, the relative spending pattern report is then displayed to the user and, in one embodiment, includes a visual display of current spending versus the average and or target spending amount for the selected period based on the relative spending pattern report parameters provided.

In one embodiment, the relative spending pattern report is displayed by activating a financial transaction item selected from a transaction register and the relative spending pattern report is displayed within the context of the selected item.

The method and apparatus for displaying relative spending pattern data disclosed herein provides the user with an intuitive and flexible presentation format that displays the relative spending data and/or reports in an easily digested visual presentation within the context of the selected item, and in relation to previous spending averages and/or targets. In addition, the method and apparatus for displaying relative spending pattern data disclosed herein requires less reading, typing and/or user interfacing to obtain and customize data. Consequently, using the method and apparatus for displaying relative spending pattern data disclosed herein it is more likely that a user will implement and use the relative spending pattern report feature.

As used herein, the term computing system implemented financial management system includes, but is not limited to: computing system implemented personal financial management systems, packages, programs, modules, or applications; computing system implemented small business financial management systems, packages, programs, modules, or applications; computing system implemented business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications, whether known at the time of filling or as developed later.

For illustrative purposes, embodiments are described within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filling or as developed later. Some embodiments are implemented in a mobile computing system running mobile operating systems such as Symbian® OS, Windows® Mobile, or any other operating system designed to generally manage operations on a mobile computing system, whether known at the time of filling or as developed later. As described more fully below, embodiments can be implemented on computing systems other than a conventional computing system such as, for example, a personal digital assistant, a cell phone, or other computing system capable of processing computer readable data, whether known at the time of filling or as developed later. Computing systems also include those in which one or more computing resources (hardware or software) are located remotely and accessed via network, such as a Local Area Network (LAN), Wide Area Network (WAN), a public network, such as the Internet, a private network, or other electronic medium in which data may be exchanged between one computing system and one or more other computing system(s), whether known at the time of filling or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, transmitted to a remote device, stored on any database, computer server or other storage mechanism, printed, or used in any other way. In addition, in some embodiments, the computing system implemented financial management systems described herein make use of input provided to the computer device implementing a process and/or application for displaying relative spending pattern data, discussed herein, via user interface devices such as a keyboard, mouse, touchpad, or any other device capable of providing user input to a computing system or for translating user actions into computing system operations, whether known at the time of filling or as developed later.

Hardware System Architecture

FIG. 1 is a block diagram of an exemplary hardware architecture for implementing one embodiment of a method and apparatus for displaying relative spending pattern data, discussed herein, that includes: a computing system 100, e.g., a first computing system; a computing system 150, e.g., a second computing system; a server system 120; and a database 170, all operatively connected by a network 130.

As seen in FIG. 1, computing system 100 typically includes a central processing unit (CPU) 101, hereinafter processor 101, an input/output (I/O) interface 105, and a memory system 103, including cache memory 103A. In one embodiment, memory system 103 includes one or more computing system implemented financial management systems 180 stored, in whole, or in part, therein, that are used by, or include, as discussed below, a process for displaying relative spending pattern data, such as process for displaying relative spending pattern data 200 discussed below, and/or an application for displaying relative spending pattern reports, such as application for displaying relative spending pattern reports 401, discussed below.

Computing system 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of inputting data to, and outputting data from, computing system 100, whether known at the time of filing or as later developed. As discussed in more detail below, in one embodiment, a process for displaying relative spending pattern data, such as process for displaying relative spending pattern data 200, and/or an application for displaying relative spending pattern reports, such as application for displaying relative spending pattern reports 401, and a computing system implemented financial management system 180, can be loaded, in whole, or in part, into computing system 100 via I/O device 113, such as from a CD, DVD or floppy disk containing all, or part, of computing system implemented financial management system 180.

Similarly, computing system 150 typically includes a central processing unit (CPU) 151, hereinafter processor 151, an input/output (I/O) interface 155, and a memory system 153, including cache memory 153A. In one embodiment, memory system 153 includes one or more computing system implemented financial management systems 190 stored, in whole, or in part, therein, that are used by, or include, as discussed below, a process for displaying relative spending pattern data, such as process for displaying relative spending pattern data 200, and/or an application for displaying relative spending pattern reports, such as application for displaying relative spending pattern reports 401.

Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether known at the time of filing or as later developed. As discussed in more detail below, in one embodiment, a process for displaying relative spending pattern data, such as process for displaying relative spending pattern data 200, and/or an application for displaying relative spending pattern reports, such as application for displaying relative spending pattern reports 401, and a computing system implemented financial management system 190, can be loaded, in whole, or in part, into computing system 150 via I/O device 163, such as from a CD, DVD or floppy disk containing all, or part, of computing system implemented financial management system 190.

Also shown in FIG. 1 is database 170. In one embodiment, database 170 is a designated server system or computing system, or a designated portion of a server system or computing system, such as computing systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for displaying relative spending pattern data, such as process for displaying relative spending pattern data 200, and/or an application for displaying relative spending pattern reports, such as application for displaying relative spending pattern reports 401, and/or computing system implemented financial management system 180 and/or computing system implemented financial management system 190 are stored in whole, or in part, in database 170.

In one embodiment, computing systems 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for displaying relative spending pattern data, such as process for displaying relative spending pattern data 200, and/or an application for displaying relative spending pattern reports, such as application for displaying relative spending pattern reports 401, and a computing system implemented financial management system 180 and/or computing system implemented financial management system 190 are stored in whole, or in part, in server system 120.

Network 130 can be any network or network system that is of interest to a user such as a Local Area Network (LAN), a Wide Area Network (WAN), a public network, such as the Internet, a private network, or other network capable of allowing communication between two or more computing systems, whether known at the time of filing or as later developed. In various embodiments, server system network interface 122 and I/O interfaces 105 and 155 include analog modems, digital modems, a network interface card, a broadband connection, or any other means for communicably coupling computing systems 100 and 150, database 170, and server system 120, via network 130, whether known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for displaying relative spending pattern data, such as process for displaying relative spending pattern data 200, and/or an application for displaying relative spending pattern reports, such as application for displaying relative spending pattern reports 401, and a computing system implemented financial management system 180 and/or computing system implemented financial management system 190 are stored in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for displaying relative spending pattern data, such as process for displaying relative spending pattern data 200, and/or an application for displaying relative spending pattern reports, such as application for displaying relative spending pattern reports 401, and a computing system implemented financial management system, are sometimes referred to herein, alternatively, as a process, an application, a module, a program, a component of a software system, a component of a software package, a component of a parent system, or a feature of a parent system, this terminology is illustrative only. In some embodiments, a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, are capable of being called from an application or the operating system. In one embodiment, an application or program is generally defined to be any executable code. Moreover, those of skill in the art will understand that when it is said that an application or an operation takes some action, the action is the result of executing one or more instructions by a processor, such as processors 101 and 151, or server system processor 121. In one embodiment, execution of a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, by processor 101, processor 151, or server system processor 121, results in the operations of an agent computer process (not shown) and/or a rule computer process (not shown).

In one embodiment, a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, are a computer application or process implemented and/or run and/or stored, in full, or in part, in, or on, a computer program product. Herein, a computer program product comprises a medium configured to store or transport computer readable code, whether known at the time of filing or as later developed. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or process capable of delivering computer readable data representing computer readable code, whether known at the time of filing or as later developed. This medium may belong to a computing system, such as computing systems 100 and 150 of FIG. 1, described above. However, the medium also may be removed from the computing system.

For example, all, or part, of a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, may be stored in a memory that is physically located in a location, such as server system memory 123, or database 170, of FIG. 1, different from a computing system, such as computing systems 100 and/or 150 of FIG. 1, utilizing a process for displaying relative spending pattern data, such as process for displaying relative spending pattern data 200, and/or an application for displaying relative spending pattern reports, such as application for displaying relative spending pattern reports 401, and a computing system implemented financial management system. In one embodiment, all, or part, of a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, may be stored in a memory that is physically located, separate from the computing system's processor(s), such as processors 101 and 151 of FIG. 1, and the computing system processor(s) can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server system, such as computing systems 100 and/or 150 and/or server system 120 of FIG. 1, running and/or utilizing and/or storing all, or part, of a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, is a portable computer, a workstation, a two-way pager, a cellular telephone, a smart phone, a digital wireless telephone, a personal digital assistant, a server computer, an Internet appliance, or any other device that includes components that can execute all, or part, of a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, in accordance with at least one of the embodiments as described herein. Similarly, in another embodiment, a process for displaying relative spending pattern data, such as process for displaying relative spending pattern data 200, and/or an application for displaying relative spending pattern reports, such as application for displaying relative spending pattern reports 401, and a computing system implemented financial management system, discussed herein, are implemented on and/or run and/or stored on a computing system and/or server system that is comprised of multiple different computers, wireless devices, cellular telephones, digital telephones, two-way pagers, personal digital assistants, server computers, or any desired combination of these devices, that are interconnected to perform the processes as described herein.

Process

Figure 2:
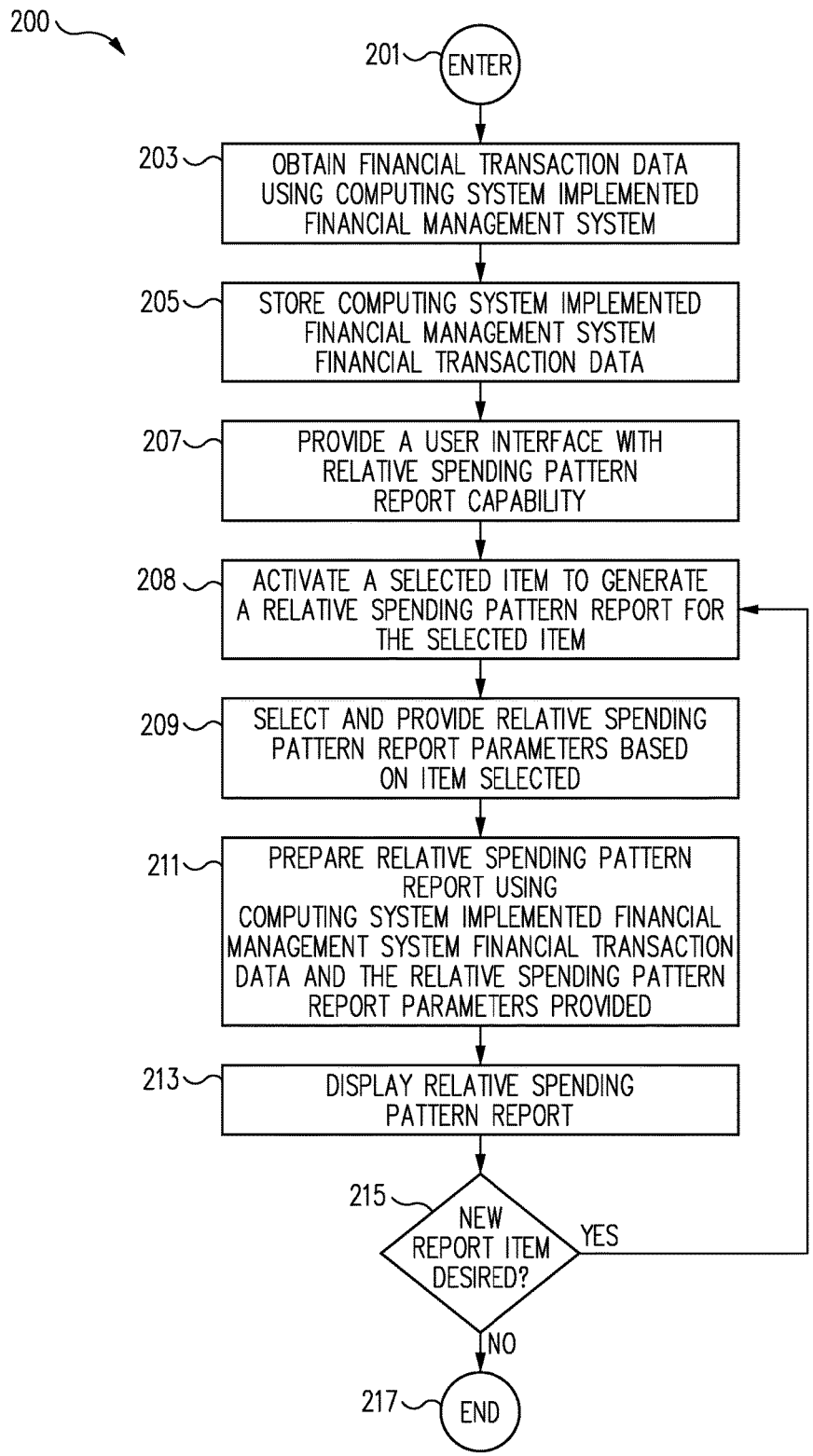
FIG. 2 is a flow chart depicting a process for displaying relative spending pattern data in accordance with one embodiment.

FIG. 2 is a flow chart depicting a process for displaying relative spending pattern data 200 in accordance with one embodiment. Process for displaying relative spending pattern data 200 begins at ENTER OPERATION 201 and process flow proceeds to OBTAIN FINANCIAL TRANSACTION DATA USING COMPUTING SYSTEM IMPLEMENTED FINANCIAL MANAGEMENT SYSTEM OPERATION 203.

At OBTAIN FINANCIAL TRANSACTION DATA USING COMPUTING SYSTEM IMPLEMENTED FINANCIAL MANAGEMENT SYSTEM OPERATION 203 a computing system implemented financial management system, such as computing system implemented financial management system 180 and/or computing system implemented financial management system 190 Of FIG. 1, is used to obtain data representing, and associated with, various financial accounts and specific financial transactions, and to categorize the transactions and/or account activity.

As noted above, various computing system implemented financial management systems are currently available. As also noted above, as used herein, the term computing system implemented financial management system includes, but is not limited to: computing system implemented personal financial management systems, packages, programs, modules, or applications; computing system implemented small business financial management systems, packages, programs, modules, or applications; computing system implemented general business systems, packages, programs, modules, or applications; computing system implemented tax preparation systems, packages, programs, modules, or applications; computing system implemented accounting and/or invoicing systems, packages, programs, modules, or applications; and various other electronic transaction driven data management systems, packages, programs, modules, or applications.

Many computing system implemented financial management systems help users manage their finances by providing a centralized interface with banks, credit card companies, and other various financial institutions, for identifying and categorizing user financial transactions. Computing system implemented financial management systems typically obtain electronic transaction based information, such as payee, payment amount, date, etc. via communication with banks, credit card providers, or other financial institutions, using electronic data transfer systems such as the Open Financial Exchange (OFX) specification, Web Direct, or various other systems for transferring financial transaction data.

In one embodiment, once the data representing various financial accounts and transactions is obtained and categorized at OBTAIN FINANCIAL TRANSACTION DATA USING COMPUTING SYSTEM IMPLEMENTED FINANCIAL MANAGEMENT SYSTEM OPERATION 203, process flow proceeds to STORE COMPUTING SYSTEM IMPLEMENTED FINANCIAL MANAGEMENT SYSTEM FINANCIAL TRANSACTION DATA OPERATION 205.

At STORE COMPUTING SYSTEM IMPLEMENTED FINANCIAL MANAGEMENT SYSTEM FINANCIAL TRANSACTION DATA OPERATION 205, the data representing various financial accounts and transactions obtained and categorized at OBTAIN FINANCIAL TRANSACTION DATA USING COMPUTING SYSTEM IMPLEMENTED FINANCIAL MANAGEMENT SYSTEM OPERATION 203 is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

Returning to FIG. 2, in some embodiments, the means for storing the data described above are maintained, in whole, or in part, by: the user, or a user computing system; a financial institution; the provider of a parent computing system implemented financial management system employing process for displaying relative spending pattern data 200; the provider of process for displaying relative spending pattern data 200; a third party data storage service; or any other parties.

In one embodiment, once the data representing various financial accounts and transactions obtained and categorized at OBTAIN FINANCIAL TRANSACTION DATA USING COMPUTING SYSTEM IMPLEMENTED FINANCIAL MANAGEMENT SYSTEM OPERATION 203 is saved by storing the data at STORE COMPUTING SYSTEM IMPLEMENTED FINANCIAL MANAGEMENT SYSTEM FINANCIAL TRANSACTION DATA OPERATION 205 process flow proceeds to PROVIDE A USER INTERFACE WITH RELATIVE SPENDING PATTERN REPORT CAPABILITY OPERATION 207.

According to one embodiment, at PROVIDE A USER INTERFACE WITH RELATIVE SPENDING PATTERN REPORT CAPABILITY OPERATION 207, the user of process for displaying relative spending pattern data 200 is presented with a user interface and/or display including a transaction register. In one embodiment, the transaction register of the user interface and/or display includes a listing of various financial transactions over a designated timeframe.

FIG. 3A shows one embodiment of a user interface and/or display 300A as it would be displayed on the screen of a display device, such as display devices 115 and 165 of FIG. 1. As shown in FIG. 3A, user interface and/or display 300A includes transaction register 302. As noted above, in one embodiment transaction register 302 includes a listing of all the financial transactions (301, 303, 305, 307, 309, 311, 313, 315, 317) having taken place, to date, over the designated timeframe, in this particular example, the month of September, as shown in timeframe field 304 of user interface and/or display 300A.

As shown in FIG. 3A, in one embodiment, each of the financial transactions 301, 303, 305, 307, 309, 311, 313, 315, 317, includes the following information associated with a given specific transaction: the date on which the financial transaction took place; the payee of the financial transaction; the amount of the financial transaction; the category assigned to the financial transaction, typically as assigned by the computing system implemented financial management system, such as computing system implemented financial management systems 180 and/or 190 FIG. 1; and the payment source used to conduct a financial transaction. Returning to FIG. 3A, as an example, financial transaction 301 is shown as having taken place on September 1 and consisted of a payment of amount $3.30 to the payee Starbucks using an ATM card and financial transaction 301 was categorized as "dining out". Likewise, financial transaction 303 is shown as having taken place on September 1 and consisted of a payment of the amount $56.75 to payee Chevron using a credit card and financial transaction 303 was categorized as "gas". Likewise, financial transaction 305 is shown as having taken place on September 4 and consisted of a payment of amount $106.21 to payee Safeway Stores using an ATM card and financial transaction 305 was categorized as "groceries". Likewise, financial transaction 307 is shown as having taken place on September 5 and consisted of a payment of the amount $96.30 to payee PG&E using a bill pay feature of a checking account and financial transaction 307 was categorized as "utilities". Likewise, financial transaction 309 is shown as having taken place on September 6 and consisted of a payment of the amount $86.01 to payee cell phone using a bill pay feature of a checking account and financial transaction 309 was categorized as "phone". Likewise, financial transaction 311 is shown in as having taken place on September 8 and consisted of a payment of the amount $5.92 to payee Starbucks using an ATM card and financial transaction 311 was categorized as "dining out". Likewise, financial transaction 313 is shown as having taken place on September 15 and consisted of a payment of the amount $406.21 to payee Joe's Auto using a credit card and financial transaction 313 was categorized as "auto repair". Likewise, financial transaction 315 is shown as having taken place on September 15 and consisted of a payment of the amount $1425.00 to payee IRS using a check numbered 131 and financial transaction 315 was categorized as "taxes". Likewise, financial transaction 317 is shown as having taken place on September 15 and consisted of a payment of the amount $189.13 to payee Acme Plumbing using a check numbered 132 and financial transaction 317 was categorized as "home repair".

Methods, means, mechanisms, and processes for creating, populating, and operating financial transaction registers, such as financial transaction register 302 of user interface and/or display 300A, using a computing system implemented financial management system are well known to those of skill in the art. Consequently, a more detailed discussion of the methods, means, mechanisms, and processes for creating, populating, and operating, financial transaction register 302 of user interface and/or display 300A are omitted here to avoid detracting from the invention.

Those of skill in the art will readily recognize that the choice of information displayed, the organization of the information displayed, and the manner in which the information is displayed in FIG. 3A was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300A of FIG. 3A are possible, and that the specific means discussed above do not limit the invention as set forth in the claims below.

Returning to FIG. 2, in one embodiment, once the user of process for displaying relative spending pattern data 200 is presented with a user interface and/or display at PROVIDE A USER INTERFACE WITH RELATIVE SPENDING PATTERN REPORT CAPABILITY OPERATION 207, process flow proceeds to ACTIVATE A SELECTED ITEM TO GENERATE A RELATIVE SPENDING PATTERN REPORT FOR THE SELECTED ITEM OPERATION 208.

In one embodiment, at ACTIVATE A SELECTED ITEM TO GENERATE A RELATIVE SPENDING PATTERN REPORT FOR THE SELECTED ITEM OPERATION 208 a user selects an item and activates the selected item to generate a relative spending report for the selected item.

In one embodiment, a user selects and activates an item at ACTIVATE A SELECTED ITEM TO GENERATE A RELATIVE SPENDING PATTERN REPORT FOR THE SELECTED ITEM OPERATION 208 using a user interface device, such as mouse 111, 161 or keyboard 107, 157 of FIG. 1, a touch pad, voice recognition software, a stylus, joystick, of any other method, means or mechanism known in the art for converting user actions into computer processor instructions and/or actions, whether known at the time of filing or as developed later.

In one embodiment, a user selects and activates an item at ACTIVATE A SELECTED ITEM TO GENERATE A RELATIVE SPENDING PATTERN REPORT FOR THE SELECTED ITEM OPERATION 208 using a user interface device to control a cursor on a display screen and/or clicking, hovering, highlighting, or otherwise activating the item by any mechanism known in the art for converting user actions into computer processor instructions and/or actions, whether known at the time of filing or as developed later. In one embodiment, once a user activates the selected item, the selected item is highlighted, bolded, or otherwise visually distinguished from other items on the user interface and/or display, such as user interface and/or display 300A of FIG. 3A.

As discussed in more detail below, FIG. 3B shows transaction register 302 with the payee Starbucks 306B of financial transaction 301 having been activated at ACTIVATE A SELECTED ITEM TO GENERATE A RELATIVE SPENDING PATTERN REPORT FOR THE SELECTED ITEM OPERATION 208. Consequently, according to one embodiment, payee Starbucks 306B is shown as highlighted. FIG. 3B is discussed in more detail below.

In one embodiment, once a user selects an item and activates the selected item to generate a relative spending report for the selected item at ACTIVATE A SELECTED ITEM TO GENERATE A RELATIVE SPENDING PATTERN REPORT FOR THE SELECTED ITEM OPERATION 208 process flow proceeds to SELECT AND PROVIDE RELATIVE SPENDING PATTERN REPORT PARAMETERS BASED ON ITEM SELECTED OPERATION 209.

In one embodiment, at SELECT AND PROVIDE RELATIVE SPENDING PATTERN REPORT PARAMETERS BASED ON ITEM SELECTED OPERATION 209, parameters are selected and provided that determine the portion of data, and the layout of the data, to be provided in the relative spending pattern report generated disclosed herein, as discussed below.

In one embodiment, the parameters selected and provided at SELECT AND PROVIDE RELATIVE SPENDING PATTERN REPORT PARAMETERS BASED ON ITEM SELECTED OPERATION 209 include, but are not limited to: the current timeframe of the relative spending pattern report, such as spending within the last month, quarter, six months, year, or multiple years; the timeframe or "period" upon which an average and/or target spending amount within the context of the selected item is determined, such as the average spending within the context of the selected item for the previous month, quarter, six months, year, or multiple years; which specific transactions, and from what timeframe, to display; the type of visual display employed; and/or any other parameters desired to determine what data, and the layout of that data, is to be generated in a relative spending pattern report.

In one embodiment, the default parameters selected and provided at SELECT AND PROVIDE RELATIVE SPENDING PATTERN REPORT PARAMETERS BASED ON ITEM SELECTED OPERATION 209 are chosen by the computing system implemented financial management system of OBTAIN FINANCIAL TRANSACTION DATA USING COMPUTING SYSTEM IMPLEMENTED FINANCIAL MANAGEMENT SYSTEM OPERATION 203, and/or process for displaying relative spending pattern data 200, automatically based on the particular item selected at ACTIVATE A SELECTED ITEM TO GENERATE A RELATIVE SPENDING PATTERN REPORT FOR THE SELECTED ITEM OPERATION 208. In one embodiment, the parameters are selected automatically based on historical data and/or consumer input regarding parameters associated with selected items.

For instance, in one embodiment if the item selected is a specific payee, the timeframe for the relative spending pattern report may be automatically set to the default of one month, while, if the item selected is a category, the timeframe for the relative spending pattern report may be automatically set to a period longer than a month, based in part on the particular category chosen. In another embodiment, the timeframe for the relative spending pattern report may be automatically set to a period longer than a month based on the particular payee chosen.

As more specific example, in one embodiment, if the item selected at ACTIVATE A SELECTED ITEM TO GENERATE A RELATIVE SPENDING PATTERN REPORT FOR THE SELECTED ITEM OPERATION 208 is the payee Starbucks, then, in one embodiment, the default parameters selected and provided at SELECT AND PROVIDE RELATIVE SPENDING PATTERN REPORT PARAMETERS BASED ON ITEM SELECTED OPERATION 209 might include a timeframe for the relative spending pattern report of one month, i.e., data representing spending within the current month, and the period for determining the monthly average spending might be based on the previous quarter's spending.

As another more specific example, in one embodiment, if the item selected at DATA REPORT FOR THE SELECTED ITEM OPERATION 208 is the category PG&E, then, in one embodiment, the default parameters selected and provided at SELECT AND PROVIDE RELATIVE SPENDING PATTERN REPORT PARAMETERS BASED ON ITEM SELECTED OPERATION 209 might also include a timeframe for the relative spending pattern report, such as data representing spending within the current month, and the period for determining the monthly average spending might be based on the previous six months.

In one embodiment, the parameters selected and provided at SELECT AND PROVIDE RELATIVE SPENDING PATTERN REPORT PARAMETERS BASED ON ITEM SELECTED OPERATION 209 are entered manually by the user through a user interface device, such as mouse 111 of FIG. 1. In one embodiment, the default parameters selected and provided at SELECT AND PROVIDE RELATIVE SPENDING PATTERN REPORT PARAMETERS BASED ON ITEM SELECTED OPERATION 209 of FIG. 2 are chosen by the computing system implemented financial management system of OBTAIN FINANCIAL TRANSACTION DATA USING COMPUTING SYSTEM IMPLEMENTED FINANCIAL MANAGEMENT SYSTEM OPERATION 203, and/or process for displaying relative spending pattern data 200, automatically as defaults, but these defaults can be overridden by the user via manual entry or through selections on a pull down and/or other menu and/or user interface display.

Returning to FIG. 2, in one embodiment, once parameters are selected and provided that determine the portion of data, and the layout of the data, to be provided in the relative spending pattern report at SELECT AND PROVIDE RELATIVE SPENDING PATTERN REPORT PARAMETERS BASED ON ITEM SELECTED OPERATION 209, process flow proceeds to PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211.

At PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211, a relative spending pattern report, such as relative spending pattern reports 300B, 300C, 300D, and 300E of FIGS. 3B, 3C, 3D and 3E is prepared using the data obtained at OBTAIN FINANCIAL TRANSACTION DATA USING COMPUTING SYSTEM IMPLE- MENTED FINANCIAL MANAGEMENT SYSTEM OPERATION 203 of FIG. 2, and saved at STORE COMPUTING SYSTEM IMPLEMENTED FINANCIAL MANAGEMENT SYSTEM FINANCIAL TRANSACTION DATA OPERATION 205, within the parameters set at SELECT AND PROVIDE RELATIVE SPENDING PATTERN REPORT PARAMETERS BASED ON ITEM SELECTED OPERATION 209.

A more detailed discussion of the preparation of a relative spending pattern report, such as relative spending pattern reports 300B, 300C, 300D, and 300E of FIGS. 3B, 3C, 3D, and 3E, respectively, is provided below with respect to FIGS. 4 and 5. Once the relative spending pattern report, such as relative spending pattern reports 300B, 300C, 300D, and 300E of FIGS. 3B, 3C, 3D, and 3E, is prepared using the data obtained at OBTAIN FINANCIAL TRANSACTION DATA USING COMPUTING SYSTEM IMPLEMENTED FINANCIAL MANAGEMENT SYSTEM OPERATION 203 of FIG. 2, and saved at STORE COMPUTING SYSTEM IMPLEMENTED FINANCIAL MANAGEMENT SYSTEM FINANCIAL TRANSACTION DATA OPERATION 205, within the parameters set at SELECT AND PROVIDE RELATIVE SPENDING PATTERN REPORT PARAMETERS BASED ON ITEM SELECTED OPERATION 209, at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211, process flow proceeds to DISPLAY RELATIVE SPENDING PATTERN REPORT OPERATION 213.

At DISPLAY RELATIVE SPENDING PATTERN REPORT OPERATION 213 the relative spending pattern report prepared at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 is displayed on a display device, such as display devices 111, 165 or 125 of FIG. 1.

As discussed above, FIG. 3A shows one embodiment of a user interface and/or display 300A as it would be displayed on the screen of a display device, such as display devices 115, 165 or 125 of FIG. 1, or any other device capable of displaying data, whether known at the time of filing or as later developed.

As shown in FIG. 3A, user interface and/or display 300A includes transaction register 302 that includes financial transactions 301, 303, 305, 307, 309, 311, 313, 315, 317, generated using the data obtained at OBTAIN FINANCIAL TRANSACTION DATA USING COMPUTING SYSTEM IMPLEMENTED FINANCIAL MANAGEMENT SYSTEM OPERATION 203 of FIG. 2, and saved at STORE COMPUTING SYSTEM IMPLEMENTED FINANCIAL MANAGEMENT SYSTEM FINANCIAL TRANSACTION DATA OPERATION 205.

FIG. 3B shows one embodiment of interface and/or display 300B and transaction register 302 including relative spending pattern report 319B as would be displayed at DISPLAY RELATIVE SPENDING PATTERN REPORT OPERATION 213 (FIG. 2) after: the item payee Starbucks 306B (FIG. 3B) has been selected and activated at ACTIVATE A SELECTED ITEM TO GENERATE A RELATIVE SPENDING PATTERN REPORT FOR THE SELECTED ITEM OPERATION 208 (FIG. 2) by the methods discussed above; the relative spending pattern report parameters have been selected and provided for the item payee Starbucks at SELECT AND PROVIDE RELATIVE SPENDING PATTERN REPORT PARAMETERS BASED ON ITEM SELECTED OPERATION 209; and relative spending pattern report 319B (FIG. 3B) has been generated at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 (FIG. 2).

As seen in FIG. 3B, in one embodiment, relative spending pattern report 319B includes: selected item name field 321B; report timeframe field 323B; average/target based on field 325B; visual display field 327B; data field 329B; and transactions field 331B.

In the specific example shown in FIG. 3B, selected item name field 321B includes "Starbucks Spending" indicating that the item selected at ACTIVATE RELATIVE SPENDING PATTERN REPORT FOR A SELECTED ITEM OPERATION 208 of FIG. 2 was the payee Starbucks 306B.

Returning to FIG. 3A, in this specific example, report timeframe field 323B of relative spending pattern report 319B indicates that the timeframe parameter from SELECT AND PROVIDE RELATIVE SPENDING PATTERN REPORT PARAMETERS BASED ON ITEM SELECTED OPERATION 209 (FIG. 2) is a month, in this specific example, the current month of September, as shown by date field 304 of FIG. 3B. As discussed above, in one embodiment, the timeframe shown in report timeframe field 323B is automatically selected by the computing system implemented financial management system based on historical transaction data collected by the computing system implemented financial management system and/or input provided to the provider of the computing system implemented financial management system and/or process for displaying relative spending pattern data 200 by customers/users. As discussed above, in one embodiment, the timeframe of report timeframe field 323B is an automatically selected default which can be overwritten by the user. In one embodiment the timeframe shown in report timeframe field 323B is manually chosen by the user.

In the specific example of FIG. 3B, average/target based on field 325B of relative spending pattern report 319B indicates that when determining the average spending over the timeframe shown in report timeframe field 323B, in this particular example, over the timeframe of a month, data was gathered from the previous quarter and then, in this particular example, divided by three, representing the three months in a quarter, to determine the average and/or target spending per month. As discussed above, in one embodiment the period of average/target based on field 325B is automatically selected by the computing system implemented financial management system based on historical transaction data collected by the computing system implemented financial management system and/or input provided to the provider of the computing system implemented financial management system, and/or process for displaying relative spending pattern data 200, by customers/users. As discussed above, in one embodiment the period of average/target based on field 325B is an automatically selected default which can be overwritten by the user. In one embodiment the period is manually chosen by the user.

As also shown in FIG. 3B, in one embodiment, relative spending pattern report 319B, includes visual display field 327B. In accordance with one embodiment, visual display field 327B provides the user with a graphical and/or visual display of the user's spending with respect to the average and/or target spending for the selected item of over the timeframe shown in report timeframe field 323B. In various embodiments, visual display field 327B includes, but is not limited to: thermometer type displays; standard bar graphs; pie charts; one or more graphical symbols, such as stars; a sliding scale; any partially filed figure or symbol, or outline thereof; color coding; singular symbols, multiple symbols; or any graphical/visual display capable of representing a quantity, or level, of spending. Moreover, these symbols, graphical displays, and scales may, in some embodiments, display either spending to date or the remaining portion of the average of targeted spending associated with the selected item. Consequently the specific form of visual display field 327B discussed herein was chosen for illustrative purposes only and does not limit the scope as claimed.

In one embodiment, the form chosen for visual display field 327B is automatically selected by the computing system implemented financial management system based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. As discussed above, in one embodiment, the form chosen for visual display field 327B is an automatically selected default which can be overwritten by the user. In one embodiment the form chosen for visual display field 327B is manually chosen by the user.

As shown in FIG. 3B, in this specific example, visual display field 327B is horizontal "thermometer-type" display. As also shown in FIG. 3B, visual display field 327B shows a visual representation of the spending to date associated with the selected item payee Starbucks of selected item name field 321B, in black in visual display field 327B, as well as a line indicating the 50% mark of the average and/or target spending, averaged over the period of average/target based on field 325B for the timeframe of report timeframe field 323B. In this specific example, the 50% mark is chosen because, as discussed below, the stipulated date for this specific relative spending pattern report 319B is September 15, that is to say, halfway through the timeframe of report timeframe field 323B. Consequently, in this specific example, any level of spending to the left of the line representing the 50% mark shows that the user is within the average and/or targeted spending level for the timeframe of report timeframe field 323B.

As also shown in FIG. 3B, in one embodiment, relative spending pattern report 319B, includes data field 329B. In one embodiment, data field 329B shows relevant data of interest to the user associated with the selected item of selected item name field 321B, the report timeframe of report timeframe field 323B, the average and/or target spending level of average/target based on field 325B, and/or visual display field 327B.

In this particular example, data field 329B includes an entry showing that the average and/or target spending level for the selected item payee Starbucks is $35.66 per month. Data field 329B also includes an entry showing that the amount spent to date at Starbucks is $9.22. Data field 329B further shows that the $9.22 spent to date represents 26% of the average and/or target spending level of $35.66 per month. In addition, data field 329B shows that the date of this particular relative spending pattern report 319B is September 15 and that, consequently, 50% of the selected timeframe of report timeframe field 323B, that is the month of September, has passed. Consequently, in this particular example, the user can see at a glance that, while 50% of the selected timeframe has passed, the user has only used 26% of the average and/or targeted spending for the timeframe.

Those of skill in the art will readily recognize that the choice of information displayed, the organization of the information displayed, and the manner in which the information is displayed in data field 329B was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300B of FIG. 3B are possible, and that the specific means discussed above do not limit the invention as set forth in the claims below.

As discussed above, in one embodiment, the type of data displayed in data field 329B is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system by customers/users. In one embodiment the type of data displayed in data field 329B is an automatically selected default which can be overwritten by the user. In one embodiment the type of data displayed in data field 329B is manually chosen by the user.

As also shown in FIG. 3B, in one embodiment, relative spending pattern report 319B, includes transactions field 331B. In one embodiment transactions field 331B displays all of the transactions relevant to either the timeframe of report timeframe field 323B and/or the period of average/target based on field 325B. In this particular example, transactions field 331B includes financial transaction 301 and financial transaction 311 of transactions register 302 because these are the two transactions for the month of September of timeframe of report timeframe field 323B associated with the selected item payee Starbucks of selected item name field 321B.

As noted above, those of skill in the art will readily recognize that the choice of information displayed, the organization of the information displayed, and the manner in which the information is displayed in FIG. 3B and relative spending pattern report 319B was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300B of FIG. 3B and relative spending pattern report 319B are possible, and that the specific means discussed above do not limit the invention as set forth in the claims below.

Figure 3C:
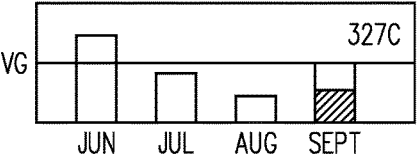
FIG. 3C shows a transaction register of a user interface and/or display and a relative spending pattern report as it would be displayed on the screen of a display device in accordance with the principles of one embodiment.

FIG. 3C shows one embodiment of interface and/or display 300C and transaction register 302 including relative spending pattern report 319C as would be displayed at DISPLAY RELATIVE SPENDING PATTERN REPORT OPERATION 213 (FIG. 2) after: the item category groceries 306C (FIG. 3C) has been selected and activated at ACTIVATE A SELECTED ITEM TO GENERATE A RELATIVE SPENDING PATTERN REPORT FOR THE SELECTED ITEM OPERATION 208 (FIG. 2) by the methods discussed above; the relative spending pattern report parameters have been selected and provided for the item category groceries at SELECT AND PROVIDE RELATIVE SPENDING PATTERN REPORT PARAMETERS BASED ON ITEM SELECTED OPERATION 209; and relative spending pattern report 319C (FIG. 3C) has been generated at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 (FIG. 2).

In the specific example shown in FIG. 3C, selected item name field 321C includes "Groceries Spending" indicating that the item selected at ACTIVATE RELATIVE SPENDING PATTERN REPORT FOR A SELECTED ITEM OPERATION 208 of FIG. 2 was the category Groceries 306C.

Returning to FIG. 3A, in this specific example, report timeframe field 323C of relative spending pattern report 319C indicates that the timeframe parameter from SELECT AND PROVIDE RELATIVE SPENDING PATTERN REPORT PARAMETERS BASED ON ITEM SELECTED OPERATION 209 (FIG. 2) is a month, in this specific example, the current month of September, as shown by date field 304 of FIG. 3C. As discussed above, in one embodiment the timeframe shown in report timeframe field 323C is automatically selected by the computing system implemented financial management system based on historical transaction data collected by the computing system implemented financial management system, process for displaying relative spending pattern data 200, and/or input provided to the provider of the computing system implemented financial management system, and/or process for displaying relative spending pattern data 200, by customers/users. In one embodiment the timeframe of report timeframe field 323C is an automatically selected default which can be overwritten by the user. In one embodiment the timeframe of report timeframe field 323C is manually chosen by the user. In a specific example of FIG. 3C, average/target based on field 325C of relative spending pattern report 319C indicates that when determining the average spending over the timeframe shown in report timeframe field 323C, in this particular example, over the timeframe of a month, data was gathered from the previous quarter and then, in this particular example, divided by three, representing the three months in a quarter, to determine the average and/or target spending per month. As discussed above, in one embodiment the period of average/target based on field 325C is automatically selected by the computing system implemented financial management system based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the period of average/target based on field 325C is an automatically selected default which can be overwritten by the user. In one embodiment the period of average/target based on field 325C is manually chosen by the user.

As also shown in FIG. 3C, in one embodiment, relative spending pattern report 319C includes visual display field 327C.

In one embodiment, the form chosen for visual display field 327C is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the form chosen for visual display field 327C is an automatically selected default which can be overwritten by the user. In one embodiment the form chosen for visual display field 327C is manually chosen by the user.

As shown in FIG. 3C, in this specific example, visual display field 327C is bar graph display showing individual bars indicating total spending in the category Groceries for each month of the previous quarter of average/target based on field 325C, i.e., June, July, and August of the previous quarter. As also shown in FIG. 3C, visual display field 327C shows a bar for the current month of September and a visual representation of the spending in the category Groceries in black. In addition, visual display field 327C includes AVG line indicating the average and/or target spending, averaged over the period of average/target based on field 325C for the timeframe of report timeframe field 323C. Consequently, in this specific example, the user is provided with a visual display in visual display field 327C of the spending in the category Groceries for each month of the previous quarter, as well as a visual indication of spending in the category Groceries for the current month, all as compared to the calculated average and/or targeted monthly spending in the category Groceries.

As also shown in FIG. 3C, in one embodiment, relative spending pattern report 319C includes data field 329C. In one embodiment, data field 329C shows relevant data of interest to the user associated with the selected item of selected item name field 321C, the report timeframe of report timeframe field 323C, the average and/or target spending level of average/target based on field 325C, and/or visual display field 327C.

In this particular example, data field 329C includes an entry showing that the average and/or target spending level for the selected item Groceries is $136.66 per month. Data field 329C also includes an entry showing that the amount spent to date on Groceries is $106.21. Data field 329C further shows that the $106.21 spent to date represents 62% of the average and/or target spending level of $136.66 per month. In addition, data field 329C shows that the date of this particular relative spending pattern report 319C is September 15 and that, consequently, 50% of the selected timeframe of report timeframe field 323C, that is the month of September, has passed.

Those of skill in the art will readily recognize that the choice of information displayed, the organization of the information displayed, and the manner in which the information is displayed in data field 329C was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300C of FIG. 3C are possible, and that the specific means discussed above do not limit the invention as set forth in the claims below. In one embodiment, the type of data displayed in data field 329C is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the type of data displayed in data field 329C is an automatically selected default which can be overwritten by the user. In one embodiment, the type of data displayed in data field 329C is manually chosen by the user.

As also shown in FIG. 3C, in one embodiment, relative spending pattern report 319C includes transactions field 331C. In one embodiment transactions field 331C displays all of the transactions relevant to either the timeframe of report timeframe field 323C and/or the period of average/target based on field 325C. In this particular example, transactions field 331C includes financial transaction 305 because this is the only transaction for the month of September of timeframe of report timeframe field 323C associated with the selected item Groceries of selected item name field 321C.

As noted above, those of skill in the art will readily recognize that the choice of information displayed, the organization of the information displayed, and the manner in which the information is displayed in FIG. 3C and relative spending pattern report 319C was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300C of FIG. 3C and relative spending pattern report 319C are possible, and that the specific means discussed above do not limit the invention as set forth in the claims below.

FIG. 3D shows one embodiment of interface and/or display 300D and transaction register 302 including relative spending pattern report 319D as would be displayed at DISPLAY RELATIVE SPENDING PATTERN REPORT OPERATION 213 (FIG. 2) after: the item payee PG&E 306D (FIG. 3D) has been selected and activated at ACTIVATE A SELECTED ITEM TO GENERATE A RELATIVE SPENDING PATTERN REPORT FOR THE SELECTED ITEM OPERATION 208 (FIG. 2) by the methods discussed above; the relative spending pattern report parameters have been selected and provided for the item payee PG&E at SELECT AND PROVIDE RELATIVE SPENDING PATTERN REPORT PARAMETERS BASED ON ITEM SELECTED OPERATION 209; and relative spending pattern report 319D (FIG. 3D) has been generated at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 (FIG. 2).

In the specific example shown in FIG. 3D, selected item name field 321D includes "PG&E Spending" indicating that the item selected at ACTIVATE RELATIVE SPENDING PATTERN REPORT FOR A SELECTED ITEM OPERATION 208 of FIG. 2 was the payee PG&E 306D.

Returning to FIG. 3A, in this specific example, report timeframe field 323D of relative spending pattern report 319D indicates that the timeframe parameter from SELECT AND PROVIDE RELATIVE SPENDING PATTERN REPORT PARAMETERS BASED ON ITEM SELECTED OPERATION 209 (FIG. 2) is one month, in this specific example, the current month of September, as shown by date field 304 of FIG. 3D. As discussed above, in one embodiment the timeframe shown in report timeframe field 323D is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment, the timeframe shown in report timeframe field 323D is an automatically selected default which can be overwritten by the user. In one embodiment the timeframe shown in report timeframe field 323D is manually chosen by the user.

In the specific example of FIG. 3D, average/target based on field 325D of relative spending pattern report 319D indicates that when determining the average spending over the timeframe shown in report timeframe field 323D, in this particular example, over the timeframe of a month, data was gathered from the previous six months and then, in this particular example, divided by six, representing the six months, to determine the average and/or target spending per month. As discussed above, in one embodiment the period of average/target based on field 325D is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the period of average/target based on field 325D is an automatically selected default which can be overwritten by the user. In one embodiment the period of average/target based on field 325D is manually chosen by the user.

As also shown in FIG. 3D, in one embodiment, relative spending pattern report 319D, includes visual display field 327D.

In one embodiment, the form chosen for visual display field 327D is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the form chosen for visual display field 327D is an automatically selected default which can be overwritten by the user. In one embodiment the form chosen for visual display field 327D is manually chosen by the user.

As shown in FIG. 3D, in this specific example, visual display field 327D is bar graph display showing individual bars indicating total spending in the payee PG&E for each month of the previous six months of average/target based on field 325D, i.e., March, April, May, June, July, and August of the previous six months. As also shown in FIG. 3D, visual display field 327D shows a bar for the current month of September, and a visual representation of the spending to date in the payee PG&E in black. In addition, visual display field 327D includes AVG line indicating the average and/or target spending, averaged over the period of average/target based on field 325D for the timeframe of report timeframe field 323D. Consequently, in this specific example, the user is provided with a visual display in visual display field 327D of the spending in the payee PG&E for each month of the previous six months, as well as a visual indication of spending in the payee PG&E for the current month, all as compared to the calculated average and/or targeted monthly spending in the payee PG&E.

As also shown in FIG. 3D, in one embodiment, relative spending pattern report 319D, includes data field 329D. In one embodiment, data field 329D shows relevant data of interest to the user associated with the selected item of selected item name field 321D, the report timeframe of report timeframe field 323D, the average and/or target spending level of average/target based on field 325D, and/or visual display field 327D.

In this particular example, data field 329D includes an entry showing that the average and/or target spending level for the selected item PG&E is $256.52 per month. Data field 329D also includes an entry showing that the amount spent to date on PG&E is $96.30. Data field 329D further shows that the $96.30 spent to date represents 37% of the average and/or target spending level of $256.52 per month. In addition, data field 329D shows that the date of this particular relative spending pattern report 319D is September 15 and that, since this payment is made only once a month, the percent of period passed is not applicable.

Those of skill in the art will readily recognize that the choice of information displayed, the organization of the information displayed, and the manner in which the information is displayed in data field 329D was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300D of FIG. 3D are possible, and that the specific means discussed above do not limit the invention as set forth in the claims below.

In one embodiment, the type of data displayed in data field 329D is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the type of data displayed in data field 329D is an automatically selected default which can be overwritten by the user. In one embodiment the type of data displayed in data field 329D is manually chosen by the user.

As also shown in FIG. 3D, in one embodiment, relative spending pattern report 319D, includes transactions field 331D. In one embodiment transactions field 331D displays all of the transactions relevant to either the timeframe of report timeframe field 323D and/or the period of average/target based on field 325D. In this particular example, transactions field 331D includes financial transaction 307 because this is the only transaction for the month of September of timeframe of report timeframe field 323D associated with the selected item PG&E. In this particular example, transactions field 331D also includes previous payments for each of the previous six months of the period of average/target based on field 325D.

As noted above, those of skill in the art will readily recognize that the choice of information displayed, the organization of the information displayed, and the manner in which the information is displayed in FIG. 3D and relative spending pattern report 319D was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300D of FIG. 3D and relative spending pattern report 319D are possible, and that the specific means discussed above do not limit the invention as set forth in the claims below.

FIG. 3E shows one embodiment of interface and/or display 300E and transaction register 302 including relative spending pattern report 319E as would be displayed at DISPLAY RELATIVE SPENDING PATTERN REPORT OPERATION 213 (FIG. 2) after: the item "Payment Source Credit Card" 306E (FIG. 3E) has been selected and activated at ACTIVATE A SELECTED ITEM TO GENERATE A RELATIVE SPENDING PATTERN REPORT FOR THE SELECTED ITEM OPERATION 208 (FIG. 2) by the methods discussed above; the relative spending pattern report parameters have been selected and provided for the item Payment Source Credit Card at SELECT AND PROVIDE RELATIVE SPENDING PATTERN REPORT PARAMETERS BASED ON ITEM SELECTED OPERATION 209; and relative spending pattern report 319E (FIG. 3E) has been generated at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 (FIG. 2).

In the specific example shown in FIG. 3E, selected item name field 321E includes "Credit Card Spending" indicating that the item selected at ACTIVATE RELATIVE SPENDING PATTERN REPORT FOR A SELECTED ITEM OPERATION 208 of FIG. 2 was the Payment Source Credit Card 306E.

Returning to FIG. 3A, in this specific example, report timeframe field 323E of relative spending pattern report 319E indicates that the timeframe parameter from SELECT AND PROVIDE RELATIVE SPENDING PATTERN REPORT PARAMETERS BASED ON ITEM SELECTED OPERATION 209 (FIG. 2) is a month, in this specific example, the current month of September, as shown by date field 304 of FIG. 3E. As discussed above, in one embodiment the timeframe shown in report timeframe field 323E is automatically selected by the computing system implemented financial management system based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the timeframe shown in report timeframe field 323E is an automatically selected default which can be overwritten by the user. In one embodiment the timeframe shown in report timeframe field 323E is manually chosen by the user.

In the specific example of FIG. 3E, average/target based on field 325E of relative spending pattern report 319E indicates that when determining the average spending over the timeframe shown in report timeframe field 323E, in this particular example, over the timeframe of a month, data was gathered from the previous year and then, in this particular example, divided by 12, representing the 12 months in a year, to determine the average and/or target spending per month. As discussed above, in one embodiment the period of average/target based on field 325E is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the period of average/target based on field 325E is an automatically selected default which can be overwritten by the user. In one embodiment the period of average/target based on field 325E is manually chosen by the user.

As also shown in FIG. 3E, in one embodiment, relative spending pattern report 319E, includes visual display field 327E.

In one embodiment, the form chosen for visual display field 327E is automatically selected by the computing system implemented financial management system based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment the form chosen for visual display field 327E is an automatically selected default which can be overwritten by the user. In one embodiment the form chosen for visual display field 327E is manually chosen by the user.

As shown in FIG. 3E, in this specific example, visual display field 327E is bar graph display showing individual bars indicating total spending in the Payment Source Credit Card for each month of the previous year of average/target based on field 325E. As also shown in FIG. 3E, visual display field 327E shows a bar for the current month of September and a visual representation of the spending in the Payment Source Credit Card in black. In addition, visual display field 327E includes AVG line indicating the average and/or target spending, averaged over the period of average/target based on field 325E for the timeframe of report timeframe field 323E. Consequently, in this specific example, the user is provided with a visual display in visual display field 327E of the spending in the Payment Source Credit Card for each month of the previous year, as well as a visual indication of spending in the Payment Source Credit Card for the current month, all as compared to the calculated average and/or targeted monthly spending in the Payment Source Credit Card. Also of note is the fact that, in this specific example, the user has already exceeded the average and/or target spending for the current month.

As also shown in FIG. 3E, in one embodiment, relative spending pattern report 319E, includes data field 329E. In one embodiment, data field 329E shows relevant data of interest to the user associated with the selected item of selected item name field 321E, the report timeframe of report timeframe field 323E, the average and/or target spending level of average/target based on field 325E, and/or visual display field 327E.

In this particular example, data field 329E includes an entry showing that the average and/or target spending level for the selected item Payment Source Credit Card is $339.02 per month. Data field 329E also includes an entry showing that the amount spent to date the selected item Payment Source Credit Card is $462.96. In one embodiment, this data is bolded to draw the user's attention to the fact he or she has already exceeded the average and/or target spending level for the month. Data field 329E further shows that the $462.96 spent to date represents 118% of the average and/or target spending level of $339.02 per month, consequently, this data is also bolded. In addition, data field 329E shows that the date of this particular relative spending pattern report 319E is September 15 and that this means only 50% of the month has passed.

Those of skill in the art will readily recognize that the choice of information displayed, the organization of the information displayed, and the manner in which the information is displayed in data field 329E was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300E of FIG. 3E are possible, and that the specific means discussed above do not limit the invention as set forth in the claims below.

In one embodiment, the type of data displayed in data field 329E is automatically selected by the computing system implemented financial management system, and/or process for displaying relative spending pattern data 200, based on historical transaction data collected by the computing system implemented financial management system, and/or process for displaying relative spending pattern data 200, and/or input provided to the provider of the computing system implemented financial management system, and/or process for displaying relative spending pattern data 200, by customers/users. In one embodiment, the type of data displayed in data field 329E is an automatically selected default which can be overwritten by the user. In one embodiment, the type of data displayed in data field 329E is manually chosen by the user.

As also shown in FIG. 3E, in one embodiment, relative spending pattern report 319E, includes transactions field 331E. In one embodiment transactions field 331E displays all of the transactions relevant to either the timeframe of report timeframe field 323E and/or the period of average/target based on field 325E. In this particular example, transactions field 331E includes financial transactions 303 and 313 because these are the only transactions for the month of September of timeframe of report timeframe field 323E associated with the selected item. This data also shows the user that the apparent reason he or she has already exceeded the average and/or target spending level for the month is largely due to car repairs.

As noted above, those of skill in the art will readily recognize that the choice of information displayed, the organization of the information displayed, and the manner in which the information is displayed in FIG. 3E and relative spending pattern report 319E was made for illustrative purposes only and that other types of information, organization of that information, and manner of displaying the information, can be implemented without departing from the scope of the invention as set forth in the claims below. In addition, those of skill in the art will readily recognize that various means for interfacing with, activating, or editing, the information displayed on display screen layout 300E of FIG. 3E and relative spending pattern report 319E are possible, and that the specific means discussed above do not limit the invention as set forth in the claims below.

In one embodiment, once the relative spending pattern report, prepared at PREPARE RELATIVE SPENDING PATTERN REPORT USING COMPUTING SYSTEM IMPLEMENTED FINANCIAL MANAGEMENT SYSTEM FINANCIAL TRANSACTION DATA AND THE RELATIVE SPENDING PATTERN REPORT PARAMETERS PROVIDED OPERATION 211 is displayed at DISPLAY RELATIVE SPENDING PATTERN REPORT OPERATION 213, process flow proceeds to NEW REPORT ITEM DESIRED? OPERATION 215.

At NEW REPORT ITEM DESIRED? OPERATION 215, the user of process for displaying relative spending pattern data 200 is given the opportunity to change the item and/or category and/or the date parameters of the relative spending pattern report, i.e., essentially create a new report, without leaving the present display. In one embodiment, if the user does not wish to change the item and/or category and/or relative spending pattern report parameters, i.e., the user does not wish a new report, a "NO" result is returned at NEW REPORT ITEM DESIRED? OPERATION 215 and process for displaying relative spending pattern data 200 is exited at END OPERATION 217.

If on the other hand, if the user does wish to change the item and/or category and/or relative spending pattern report parameters, i.e., the user does wish a new report, a "YES" result is returned at NEW REPORT ITEM DESIRED? OPERATION 215 and process for displaying relative spending pattern data 200 returns to SELECT AND PROVIDE RELATIVE SPENDING PATTERN REPORT PARAMETERS BASED ON ITEM SELECTED OPERATION 209.

Process for displaying relative spending pattern data 200 can be returned to SELECT AND PROVIDE RELATIVE SPENDING PATTERN REPORT PARAMETERS BASED ON ITEM SELECTED OPERATION 209 from NEW REPORT ITEM DESIRED? OPERATION 215 by selecting the "YES" option at NEW REPORT ITEM DESIRED? OPERATION 215 as often as desired. Once all the desired item, category and date parameters have been selected and displayed at DISPLAY RELATIVE SPENDING PATTERN REPORT OPERATION 213, the user enters a "NO" result at NEW REPORT ITEM DESIRED? OPERATION 215 and process for displaying relative spending pattern data 200 is exited at END OPERATION 217.

In some embodiments, some of, or all of, the data associated with, created by, processed by, used by, or modified by, process for displaying relative spending pattern reports 200 and/or relative spending pattern reports 300B, 300C, 300D, and 300E, is saved by storing the data, in whole, or in part, by any one of the numerous mechanisms known to those of skill in the art. For instance, in one embodiment, the data, in whole, or in part, is stored in a memory system, such as memory systems 103, 153 or server memory system 123, or database 170, of FIG. 1, or in a cache memory, such as cache memory 103A or 153A of FIG. 1, or in any main memory or mass memory, associated with a computing device, such as computing systems 100, 151, described above. In one embodiment, the data, in whole, or in part, is stored in any computing device and/or server system, such as computing systems 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing the data described above are maintained, in whole, or in part, by: the user, or a user computing system; a financial institution; the provider of a parent computing system implemented financial management system employing process for displaying relative spending pattern data 200; the provider of process for displaying relative spending pattern data 200; a third party data storage service; or any other parties.

Process for displaying relative spending pattern data 200 provides the user with an intuitive and flexible presentation format that displays the relative spending data and/or reports, such as relative spending pattern reports 319B, 319C, 319D and 319E of FIGS. 3B, 3C, 3d and 3E, respectively, in an easily digested visual presentation within the context of the selected item, and in relation to previous spending averages and/or targets. In addition, Process for displaying relative spending pattern data 200 requires less reading, typing and/or user interfacing to obtain and customize data. Consequently, using the method and apparatus for displaying relative spending pattern data disclosed herein it is more likely that a user will implement and use the relative spending pattern report feature.

Software Architecture

Figure 4:
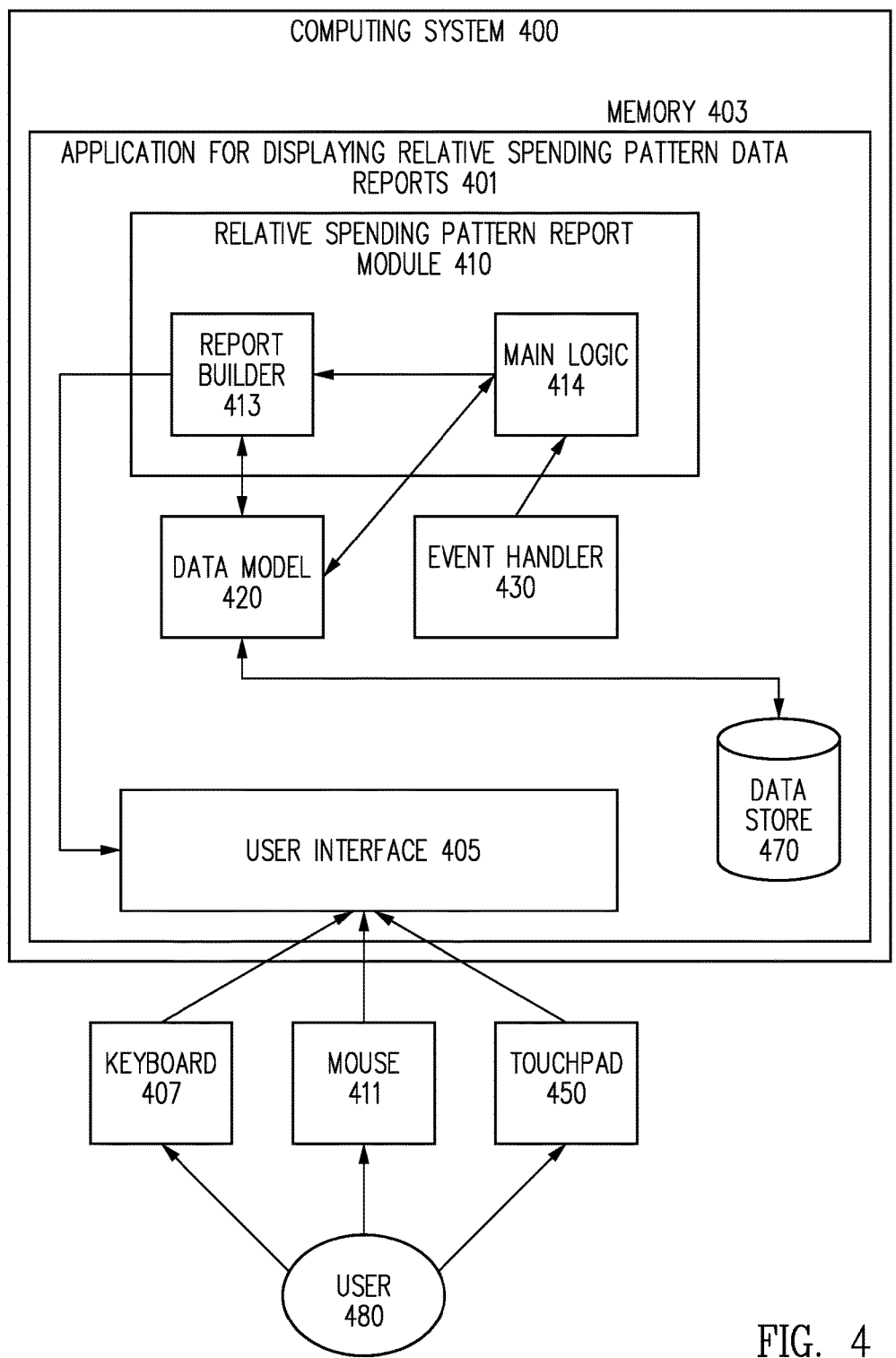
FIG. 4 shows one embodiment of a software architecture for implementing one embodiment.

FIG. 4 shows one embodiment of a software architecture for implementing one embodiment. Shown in FIG. 4 is a computing system 400. In one embodiment, computing system 400 is similar to computing systems 100 and 150 of FIG. 1 discussed above.

As noted above, some embodiments are implemented in a computing device including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing device, whether known at the time of filing or as developed later. Some embodiments are implemented in a mobile computing device running mobile operating systems such as Symbian® OS, Windows® Mobile, or any other operating system designed to generally manage operations on a mobile computing device, whether known at the time of filing or as developed later. As described more fully below, embodiments can be implemented on computing systems other than a conventional computing device such as, for example, a personal digital assistant, a cell phone, or other computing device capable of processing computer readable data, whether known at the time of filing or as developed later. Computing systems also include those in which one or more computing resources are located remotely and accessed via a network, such as a Local Area Network (LAN), Wide Area Network (WAN), the Internet, or other electronic medium in which data may be exchanged between one computing device and one or more other computing device(s), whether known at the time of filing or as developed later. Embodiments may be included as add-on software for existing software programs, packages or applications, and embodiments may be a feature of an application that is bundled with a computing device or sold separately. Some embodiments may also be implemented as functionality embedded in hardware devices and systems.

Returning to FIG. 4, computing system 400 includes application for displaying relative spending pattern reports 401. In one embodiment, all, or part of, application for displaying relative spending pattern reports 401 resides in a memory 403, such as memory systems 103, 153 or server memory system 123, or database 170, of FIG. 1, or in a cache memory, such as cache memory 103A or 153A of FIG. 1, or in any main memory or mass memory, associated with a computing device, such as computing system 400, or computing systems 100 and 150 described above. In one embodiment, all, or part of, application for displaying relative spending pattern reports 401 resides in any computing device and/or server system, such as computing systems 400, 100, 150, or server system 120, or other device, in another location, or on/in a computer readable medium, and/or any other computer program product, as defined herein. In one embodiment, all, or part of, application for displaying relative spending pattern reports 401 resides in a webpage or in a web-based system. Embodiments of application for displaying relative spending pattern reports 401 may be included as add-on software for existing software programs, packages, or applications, and embodiments may be a feature of an application that is bundled with a computing device or sold separately. Some embodiments may also be implemented as functionality embedded in hardware devices and systems.

As shown in FIG. 4, in one embodiment, application for displaying relative spending pattern reports 401 includes: relative spending pattern report module 410, including report builder 413 and main logic 414; data model module 420; event handler 430; data store 470 and user interface 405.

In one embodiment, user interface devices such as keyboard 407, mouse 411, and touchpad 450 are operatively coupled to user interface 405, and application for displaying relative spending pattern reports 401. User interface devices 407, 411 and 450 and user interface 405, provide a user 480 with an interface to application for displaying relative spending pattern reports 401.

In one embodiment, data store 470 is operatively coupled to data model module 420 of application for displaying relative spending pattern reports 401. In one embodiment, data store 470 is a memory system, such as memory systems 103, 153 or server memory system 123, or database 170, of FIG. 1, or a cache memory, such as cache memory 103A or 153A of FIG. 1, or any main memory or mass memory, associated with a computing device, such as computing systems 100 and 150 described above. In one embodiment, data store 470 is a designated server system or computing device, or a designated portion of a server system or computing device, such as systems 100, 150 and 120. In one embodiment, data store 470 is relational database or a dedicated mass storage device implemented in software, hardware, or a combination of hardware and software. In one embodiment, data store 470 a webpage or a web-based system.

In one embodiment, application for displaying relative spending pattern reports 401 includes a number of executable code portions and data files. These include code for creating and supporting a user interface, such as user interface 405, as well as for generating relative spending pattern reports, such as relative spending pattern reports 300B, 300C, 300D, and 300E discussed above. In one embodiment, application for displaying relative spending pattern reports 401 is responsible for orchestrating the operation of a process for displaying relative spending pattern data, such as process 200 of FIG. 2 discussed above. As discussed above, application for displaying relative spending pattern reports 401 of FIG. 4 includes relative spending pattern report module 410, which in turn includes report builder 413 and main logic 414.

Relative spending pattern report module 410, report builder 413 and main logic 414 need not be discrete software modules. The particular software architecture of FIG. 4 is shown for illustrative purposes. Consequently, those of skill in the art will recognize that other configurations are contemplated by, and are within the scope of, the present invention as claimed below and the invention may be practiced and implemented using numerous other architectures and in numerous other environments.

In one embodiment, data store 470 includes data created by user 480, a computing system implemented financial management system, such as computing system implemented financial management systems 180 and 190 of FIG. 1, and application for displaying relative spending pattern reports 401 of FIG. 4. In one embodiment, relative spending pattern report module 410 includes various components that operate together to implement application for displaying relative spending pattern reports 401. In one embodiment, user interface 405 displays relative spending pattern report information, such as is included in relative spending pattern reports 300B, 300C, 300D, and 300E, as discussed above with respect to FIGS. 3A, 3B, 3C, 3D and 3E, on a user's display device, such as display devices 115, 165 and 125, discussed above with respect to FIG. 1.

Returning to FIG. 4, in one embodiment, event handler 430 detects user interaction with any of the user interface devices such as keyboard 407, mouse 411, and touchpad 450 and notifies the other components of the interaction. In one embodiment, main logic 414 orchestrates relative spending pattern report generation and display including requesting data from, and sending data to, other components of relative spending pattern report module 410. In one embodiment, report builder 413 accepts as input data, the parameters specifying data, such as, for example, the parameters from SELECT AND PROVIDE RELATIVE SPENDING PATTERN DATA REPORT PARAMETERS BASED ON ITEM SELECTED OPERATION 209 of FIG. 2. In one embodiment, report builder 413 of FIG. 4 then obtains and/or updates the relevant transaction data.

Returning to FIG. 4, in one embodiment, based on these parameters and data, report builder 413 then creates a relative spending pattern report, such as relative spending pattern reports 300B, 300C, 300D, and 300E for display on a user interface 405. In one embodiment, data model module 420 retrieves the underlying transaction data from data store 470 and provides the data to the other components, such as report builder 413.

As noted above, the architecture of FIG. 4 represents but one possible implementation of a application for displaying relative spending pattern reports 401 and other embodiments, such as one in which the elements of the invention are implemented on a computer, or computing device other than the user's computing device, or one with different components and/or organization, interconnection and operational relation, are equally possible and will be readily apparent to one of skill in the art.

Figure 5:
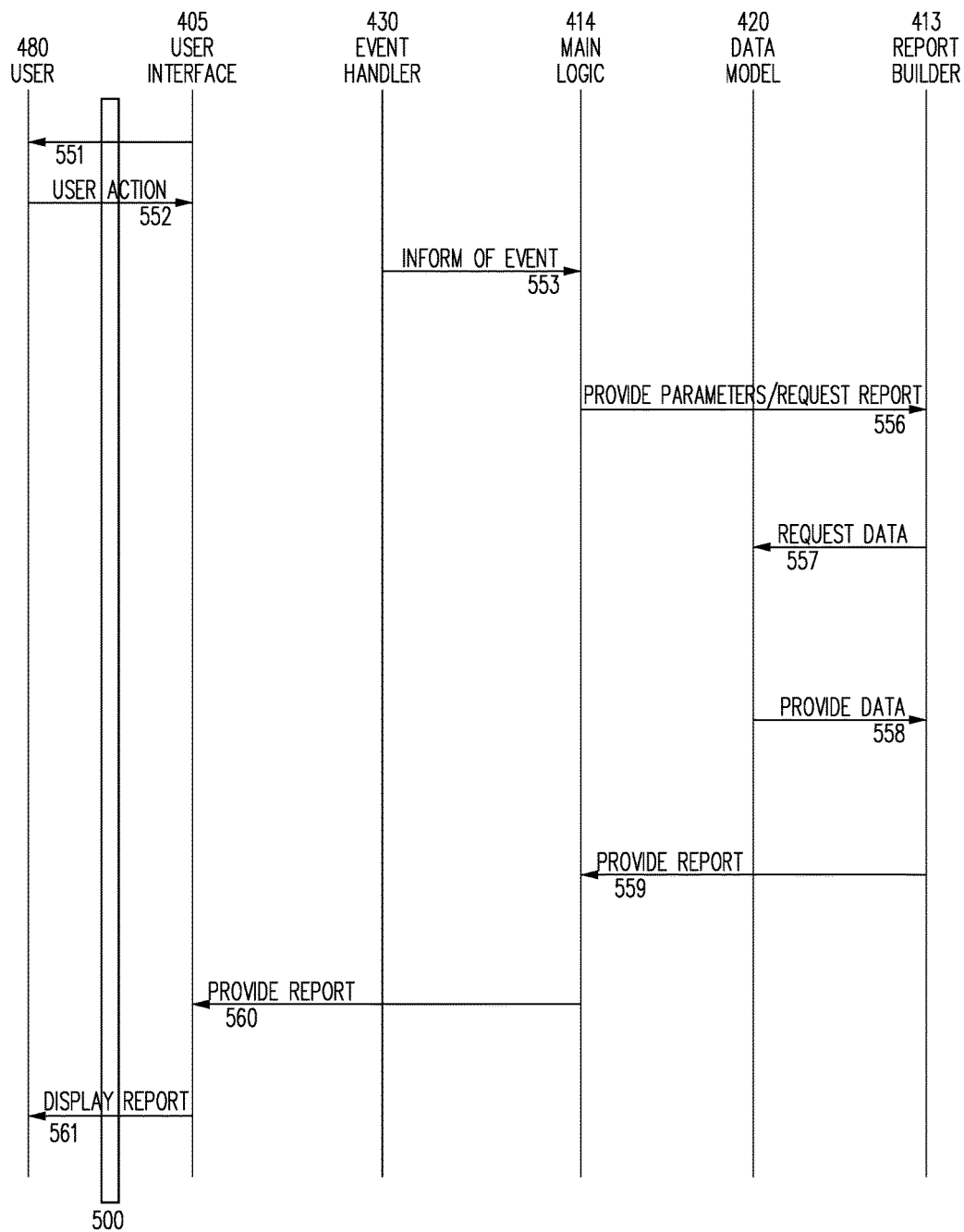
FIG. 5 is an interaction diagram illustrating interactions among system components according to one embodiment.

FIG. 5 is an interaction diagram illustrating interactions among system components according to one embodiment.

User-system boundary 500 represents the division between the user 480 of the application for displaying relative spending pattern reports, such as application for displaying relative spending pattern reports 401, to the left of user-system boundary 500, and the components of the application for displaying relative spending pattern reports, such as application for displaying relative spending pattern reports 401, to the right of user-system boundary 500.

Viewing FIGS. 4 and 5 together, user interface 405 displays the appropriate interface, such as user interface and/or display 300A of FIG. 3A to user 480 at 551. User 480 takes an action at 552 which is interpreted by user interface 405. Any number of interactions between user 480 and user interface 405 may occur before a relative spending pattern report, such as relative spending pattern reports 300A. 300B and 300C, is generated. For example, user 480 can change the data parameters requested for a relative spending pattern report or the user can change the selected item of ACTIVATE RELATIVE SPENDING PATTERN DATA REPORT FOR A SELECTED ITEM OPERATION 208 of FIG. 2. In response, the application for displaying relative spending pattern reports, such as application for displaying relative spending pattern reports 401 of FIG. 4, redraws the display so as to provide the desired relative spending pattern report and to start the process for generating and displaying the relative spending pattern report.

When user 480 performs an action causing a relative spending pattern report, such as relative spending pattern reports 300B, 300C, 300D, and 300E of FIGS. 3B, 3C, 3D, and 3E, respectively, to be generated and displayed, event handler 430 informs main logic 414 at 553 of the occurrence of the user initiated event. Main logic 414 then determines the appropriate relative spending pattern report parameters based on the user initiated event. Main logic 414 then sends a request to report builder 413 at 556 for the relative spending pattern report. In one embodiment at 556 the request includes the appropriate relative spending pattern report parameters.

Report builder 413 requests any needed financial transaction data, such as the transaction data for the dates specified in the relative spending pattern report parameters, from data model module 420 at 557. Data model module 420 then retrieves the requested data from data store 470 and provides the data to report builder 413 at 558. Based on this data, and the parameters provided within the relative spending pattern report request, report builder 413 creates a relative spending pattern report, such as relative spending pattern reports 300B, 300C, 300D, 300E of FIGS. 3B, 3C, 3D, and 3E, respectively, and provides the relative spending pattern report to main logic 414 at 559. Finally main logic 414 sends a request to user interface 405 to display the relative spending pattern report to user 480 at 560, and the relative spending pattern report is displayed at 561.

It will be apparent to those of skill in the art that the conceptual components of FIGS. 4 and 5, and the relationships shown and discussed, represent one possible means of implementing the invention. One skilled in the art will also recognize that other arrangements and combinations of components, both physical and conceptual, can also be used to implement other embodiments, without departing from the characteristics of the invention as set forth in the claims below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining" "storing", "categorizing", "providing", "activating" "adjusting", "selecting", "updating", "displaying", "preparing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for displaying relative spending pattern data, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A system for displaying spending pattern data comprising:
   one or more processors; and
   one or more memories coupled to the one or more processors, the one or more memories having instructions stored therein which when executed by the one or more processors, perform a process comprising:
   obtaining financial transaction data using a computing system implemented financial management system, the financial transaction data being of a party;
   categorizing at least a portion of the financial transaction data using the computing system implemented financial management system;
   storing the financial transaction data;
   providing an interface display, the interface display comprising a listing of two or more financial transaction items associated with the at least a portion of the financial transaction data;
   assigning a first set of spending pattern report parameters to a first one of the two or more financial transaction items, the first set of spending pattern report parameters being distinct from transaction data associated with the first transaction item, the first set of spending report parameters comprising a first type of visual display of the data to be used in a spending pattern report, wherein the first type of visual display is automatically selected by the one or more processors based on historical transaction data collected, and the system further being enabled to utilize spending parameters comprising:
   a first timeframe to be covered by a spending pattern report, and
   a first period used to determine average and target spending amounts for the spending report timeframe;
   assigning a second set of spending pattern report parameters to a second one of the two or more financial transaction items, the second set of spending pattern report parameters being distinct from transaction data associated with the second transaction item, the second set of spending report parameters comprising a second type of visual display of the data to be used in a spending pattern report, wherein the second type of visual display is automatically selected by the one or more processors based on historical transaction data collected, and the system further being enabled to utilize spending parameters including
   a second timeframe to be covered by a spending pattern report, and
   a second period used to determine average and target spending amounts for the spending report timeframe, wherein the second type of visual display is different than the first type of visual display;
   receiving a selection by the party, by an event handler informing main logic executed by the one or more processors, the selection indicating a choice of the first one of the two or more financial transaction items from the listing of two or more financial transaction items associated with the at least a portion of the financial transaction data;
   responsive to the selection of the first one of the two or more financial transaction items, visually distinguishing on the interface display the first one of the two or more financial transaction items, and choosing the first set of spending pattern report parameters;
   preparing a spending report, by a report builder executed by the one or more processors in response to a request from the main logic, using the financial transaction data and the first set of spending pattern report parameters, the spending report being customized to the first type of visual display automatically selected based on historical transaction data collected, by virtue of using the first set of spending pattern report parameters to prepare the spending report;
   utilizing the main logic to orchestrate the preparation of the report and requesting data from a data model; and
   displaying the spending pattern report in the interface display, in response to a request from the main logic, within the context of the selected first one of the two or more financial transaction items, the spending pattern report comprising:
   a visual representation of average spending associated with a characteristic of the selected first one of the two or more financial transaction items over a specified timeframe; and
   a visual representation of actual spending associated with a characteristic of the selected first one of the two or more financial transaction items during the specified timeframe, wherein the visual representation of average spending, the visual representation of actual spending, and the visually distinguished first one of the two or more financial transaction items are displayed simultaneously in the interface display.

2. The system for displaying spending pattern data of claim 1, wherein: the interface display is a transaction register and the financial transaction items are entries in the transaction register.

3. The system for displaying spending pattern data of claim 1, wherein: the financial transaction items comprise specific payees.

4. The system for displaying spending pattern data of claim 1, wherein: the financial transaction items comprise categories of one or more financial transactions.

5. The system for displaying spending pattern data of claim 1, wherein: the financial transaction items comprise payment sources used in one or more financial transactions.

6. The system for displaying spending pattern data of claim 1, wherein: the spending pattern report parameters chosen based on the selected financial transaction item comprise the period of time over which the average spending associated with the selected financial transaction item is determined.

7. The system for displaying spending pattern data of claim 1, wherein: the spending pattern report parameters chosen based on the selected financial transaction item comprise the specified timeframe.

8. The system for displaying spending pattern data of claim 1, wherein: the spending pattern report parameters chosen based on the selected financial transaction item comprise the form of the visual representation of average spending associated with the selected financial transaction item over the specified timeframe and the form of the visual representation of actual spending associated with the selected financial transaction item during the specified timeframe.

9. The system for displaying spending pattern data of claim 1, wherein: the spending pattern report further comprises a data field for displaying text based data associated with the spending pattern report.

10. The system for displaying spending pattern data of claim 1, wherein: the spending pattern report further comprises a related transactions field, the related transactions field for displaying selected specific financial transactions associated with the spending pattern report.

11. The system for displaying spending pattern data of claim 10, wherein: the spending pattern report parameters chosen based on the selected financial transaction item comprise parameters for selecting the specific financial transactions associated with the spending pattern report to be displayed in the related transactions field.

12. A system for displaying spending pattern data comprising: a processor for executing a process for displaying spending pattern data, the process for displaying spending pattern data comprising: obtaining financial transaction data using the computing system implemented financial management system, the financial transaction data being of a party;
categorizing at least a portion of the financial transaction data using the computing system implemented financial management system; storing the financial transaction data;
providing a interface display on a display device, the interface display comprising a listing of two or more financial transaction items associated with the at least a portion of the financial transaction data;
assigning a first set of spending pattern report parameters to a first one of the two or more financial transaction items, the first set of spending pattern report parameters being distinct from transaction data associated with the first transaction item, the first set of spending report parameters comprising a first type of visual display of the data to be used in a spending pattern report, wherein the first type of visual display is automatically selected by the one or more processors based on historical transaction data collected, and the system further being enabled to utilize spending parameters comprising
a first timeframe to be covered by a spending pattern report, and a first period used to determine average and target spending amounts for the spending report timeframe;
assigning a second set of spending pattern report parameters to a second one of the two or more financial transaction items, the second set of spending pattern report parameters being distinct from transaction data associated with the second transaction item, the second set of spending report parameters comprising a second type of visual display of the data to be used in a spending pattern report, wherein the second type of visual display is automatically selected by the one or more processors based on historical transaction data collected, and the system further being enabled to utilize spending parameters including
a second timeframe to be covered by a spending pattern report, and
a second period used to determine average and target spending amounts for the spending report timeframe;
wherein the second type of visual display is different than the first type of visual display;
receiving a selection by the party, by an event handler informing main logic executed by the one or more processors, the selection selecting the first one of the two or more financial transaction items from the listing of two or more financial transaction items associated with the at least a portion of the financial transaction data;
responsive to the selection of the first one of the two or more financial transaction items, visually distinguishing on the interface display the first one of the two or more financial transaction items, and choosing the first set of spending pattern report parameters;
preparing a spending report, by a report builder executed by the one or more processors in response to a request from the main logic, using the financial transaction data and the first set of spending pattern report parameters, the spending report being customized to the first type of visual display automatically selected based on historical transaction data collected by virtue of using the first set of spending pattern report parameters to prepare the spending report;
utilizing the main logic to orchestrate the preparation of the report and requesting data from a data model; and
displaying the spending pattern report in the interface display, in response to a request from the main logic, within the context of the selected first one of the two or more financial transaction items, the spending pattern report comprising:
a visual representation of average spending associated with a characteristic of the selected first one of the two or more financial transaction items over a specified timeframe; and
a visual representation of actual spending associated with a characteristic of the selected first one of the two or more financial transaction items during the specified timeframe, wherein the visual representation of average spending, the visual representation of actual spending, and the visually distinguished first one of the two or more financial transaction items are displayed simultaneously in the interface display.

13. The system for displaying spending pattern data of claim 12, wherein: the interface display is a transaction register and the financial transaction items are entries in the transaction register.

14. The system for displaying spending pattern data of claim 12, wherein: the financial transaction items comprise specific payees.

15. The system for displaying spending pattern data of claim 12, wherein: the financial transaction items comprise categories of one or more financial transactions.

16. The system for displaying spending pattern data of claim 12, wherein: the financial transaction items comprise payment sources used in one or more financial transactions.

17. The system for displaying spending pattern data of claim 12, wherein: the spending pattern report parameters chosen based on the selected financial transaction item comprise the period of time over which the average spending associated with the selected financial transaction item is determined.

18. The system for displaying spending pattern data of claim 12, wherein: the spending pattern report parameters chosen based on the selected financial transaction item comprise the specified timeframe.

19. The system for displaying spending pattern data of claim 12, wherein: the spending pattern report parameters chosen based on the selected financial transaction item comprise the form of the visual representation of average spending associated with the selected financial transaction item over the specified timeframe and the form of the visual representation of actual spending associated with the selected financial transaction item during the specified timeframe.

20. The system for displaying spending pattern data of claim 12, wherein: the spending pattern report further comprises a data field for displaying text based data associated with the spending pattern report.

21. The system for displaying spending pattern data of claim 12, wherein: the spending pattern report further comprises a related transactions field, the related transactions field for displaying selected specific financial transactions associated with the spending pattern report.

22. The system for displaying spending pattern data of claim 21, wherein: the spending pattern report parameters chosen based on the selected financial transaction item comprise parameters for selecting the specific financial transactions associated with the spending pattern report to be displayed in the related transactions field.

23. A computer program product for displaying spending pattern data comprising:
  a nontransitory computer readable medium;
  and computer program code, encoded on the computer readable medium, comprising computer readable instructions for:
  obtaining financial transaction data using a computing system implemented financial management system, the financial transaction data being of a party;
  categorizing at least a portion of the financial transaction data using the computing system implemented financial management system; storing the financial transaction data;
  providing a interface display, the interface display comprising a listing of two or more financial transaction items associated with the at least a portion of the financial transaction data;
  assigning a first set of spending pattern report parameters to a first one of the two or more financial transaction items, the first set of spending pattern report parameters being distinct from transaction data associated with the first transaction item, the first set of spending report parameters comprising a first type of visual; display of the data to be used in a spending pattern report, wherein the first type of visual display is automatically selected by the one or more processors based on historical transaction data collected, and the system further being enabled to utilize spending parameters comprising
  a first timeframe to be covered by a spending pattern report, and
  a first period used to determine average and target spending amounts for the spending report timeframe;
  assigning a second set of spending pattern report parameters to a second one of the two or more financial transaction items, the second set of spending pattern report parameters being distinct from transaction data associated with the second transaction item, the second set of spending report parameters comprising a second type of visual display of the data to be used in a spending pattern report, wherein the second type of visual display is automatically selected by the one or more processors based on historical transaction data collected, and the system further being enabled to utilize spending parameters including
  a second timeframe to be covered by a spending pattern report, and
  a second period used to determine average and target spending amounts for the spending report timeframe;
  wherein the second type of visual display is different than the first type of visual display;
  receiving a selection by the party, by an event handler informing main logic executed by the one or more processors, the selection selecting the first one of the two or more financial transaction items from the listing of two or more financial transaction items associated with the at least a portion of the financial transaction data;
  responsive to the selection of the first one of the two or more financial transaction items, visually distinguishing on the interface display the first one of the two or more financial transaction items, and automatically choosing the first set of spending pattern report parameters;
  preparing a spending report, by a report builder executed by the one or more processors in response to a request from the main logic, using the financial transaction data and the first set of spending pattern report parameters, the spending report being customized to the first type of visual display automatically selected based on historical transaction data collected, by virtue of using the first set of spending pattern report parameters to prepare the spending report;
  utilizing the main logic to orchestrate the preparation of the report and requesting data from a data model; and
  displaying the spending pattern report in the interface display, in response to a request from the main logic, within the context of the selected first one of the two or more financial transaction items, the spending pattern report comprising:
  a visual representation of average spending associated with a characteristic of the selected first one of the two or more financial transaction items over a specified timeframe; and
  a visual representation of actual spending associated with a characteristic of the selected first one of the two or more financial transaction items during the specified timeframe, wherein the visual representation of average spending, the visual representation of actual spending, and the visually distinguished first one of the two or more financial transaction items are displayed simultaneously in the interface display.

24. The computer program product for displaying spending pattern data of claim 23, wherein: the interface display is a transaction register and the financial transaction items are entries in the transaction register.

25. The computer program product for displaying spending pattern data of claim 23, wherein: the financial transaction items comprise specific payees.

26. The computer program product for displaying spending pattern data of claim 23, wherein: the financial transaction items comprise categories of one or more financial transactions.

27. The computer program product for displaying spending pattern data of claim 23, wherein: the financial transaction items comprise payment sources used in one or more financial transactions.

28. The computer program product for displaying spending pattern data of claim 23, wherein: the spending pattern report parameters chosen based on the selected financial transaction item comprise the period of time over which the average spending associated with the selected financial transaction item is determined.

29. The computer program product for displaying spending pattern data of claim 23, wherein: the spending pattern report parameters chosen based on the selected financial transaction item comprise the specified timeframe.

30. The computer program product for displaying spending pattern data of claim 23, wherein: the spending pattern report parameters chosen based on the selected financial transaction item comprise the form of the visual representation of average spending associated with the selected financial transaction item over the specified timeframe and the form of the visual representation of actual spending associated with the selected financial transaction item during the specified timeframe.

31. The computer program product for displaying spending pattern data of claim 23, wherein: the spending pattern report further comprises a data field for displaying text based data associated with the spending pattern report.

32. The computer program product for displaying spending pattern data of claim 23, wherein: the spending pattern report further comprises a related transactions field, the related transactions field for displaying selected specific financial transactions associated with the spending pattern report.

33. The computer program product for displaying spending pattern data of claim 32, wherein: the spending pattern report parameters chosen based on the selected financial transaction item comprise parameters for selecting the specific financial transactions associated with the spending pattern report to be displayed in the related transactions field.

* * * * *